United States Patent
Madine et al.

(10) Patent No.: US 10,234,305 B2
(45) Date of Patent: Mar. 19, 2019

(54) METHOD AND APPARATUS FOR PROVIDING A TARGETED MAP DISPLAY FROM A PLURALITY OF DATA SOURCES

(71) Applicant: HERE Global B.V., Veldhoven (NL)

(72) Inventors: Simon Madine, Berlin (DE); Massimiliano Marcon, Berlin (DE)

(73) Assignee: HERE Global B.V., Veldhoven (NL)

( * ) Notice: Subject to any disclaimer, the term of this patent is extended or adjusted under 35 U.S.C. 154(b) by 133 days.

(21) Appl. No.: 14/837,699

(22) Filed: Aug. 27, 2015

(65) Prior Publication Data

US 2017/0059353 A1    Mar. 2, 2017

(51) Int. Cl.
*G01C 21/34*    (2006.01)
*G01C 21/36*    (2006.01)
*G06F 17/30*    (2006.01)

(52) U.S. Cl.
CPC ..... *G01C 21/3694* (2013.01); *G01C 21/3679* (2013.01); *G06F 17/30241* (2013.01)

(58) Field of Classification Search
CPC ......... G06F 17/30896; G06F 17/30914; G01C 21/3694; G01C 21/3679
(Continued)

(56) References Cited

U.S. PATENT DOCUMENTS 7,574,652 B2 *  8/2009  Lennon ............. G06F 17/30389
                                                    715/248
8,391,118 B2 *  3/2013  Hattori ............... G11B 7/00458
                                                    369/84

(Continued)

FOREIGN PATENT DOCUMENTS

EP    2846277 A1    3/2015
EP    2786354 A4 *  7/2015   ....... G06F 17/30893

(Continued)

OTHER PUBLICATIONS

Extraction of landform information in Changbai Mountains based on Srtm-DEM and TM data; Long En; Cheng Wei-ming; Zhou Cheng-hu; Yao Yong-hui; Liu Hai-jiang; 2007 IEEE International Geoscience and Remote Sensing Symposium; Year: 2007 pp. 1966-1969, DOI: 10.1109/IGARSS.2007.4423213.*

(Continued)

*Primary Examiner* — Cuong H Nguyen
(74) *Attorney, Agent, or Firm* — Ditthavong & Steiner, P.C.

(57) ABSTRACT

An approach is provided for generating a targeted map display from a plurality of data sources. A mapping platform receives at least one request to provision at least one targeted map display for at least one device based, at least in part, on at least one targeted mapping object. The at least one targeted mapping object includes one or more parameters for retrieving targeted content from a plurality of data sources. The mapping platform also determines one or more map item detail records based, at least in part, on the one or more parameters. The one or more map item detail records include payload content assembled from the plurality of data sources about one or more map items. The mapping platform then causes, at least in part, a selective updating of the one or more map item detail records based, at least in part, on one or more validity criteria for provisioning the at least one targeted map display.

20 Claims, 16 Drawing Sheets

(58) Field of Classification Search
USPC .......... 701/409, 414; 369/84; 345/629, 632; 455/556.1
See application file for complete search history.

(56) References Cited

U.S. PATENT DOCUMENTS

| | | | | |
|---|---|---|---|---|
| 8,994,745 | B2* | 3/2015 | Mochizuki | G06F 17/30817 345/619 |
| 9,002,400 | B2* | 4/2015 | Kim | H04W 64/00 455/556.1 |
| 9,558,591 | B2* | 1/2017 | Kim | G06T 19/006 |
| 9,584,447 | B2* | 2/2017 | Leitch | H04L 47/266 |
| 9,669,302 | B2* | 6/2017 | Park | A63F 13/65 |
| 9,799,142 | B2* | 10/2017 | Mullins | G06F 3/048 |
| 9,799,143 | B2* | 10/2017 | Mullins | G06T 19/006 |
| 9,830,395 | B2* | 11/2017 | Mullins | G06F 17/3087 |
| 9,870,429 | B2* | 1/2018 | Stirbu | G06F 17/30893 |
| 2004/0015783 | A1* | 1/2004 | Lennon | G06F 17/30389 715/235 |
| 2012/0008479 | A1* | 1/2012 | Hattori | G11B 7/00458 369/84 |
| 2012/0215624 | A1* | 8/2012 | Ramer | G06F 17/30867 705/14.44 |
| 2013/0073473 | A1* | 3/2013 | Heath | G06Q 30/02 705/319 |
| 2013/0135344 | A1* | 5/2013 | Stirbu | G06F 17/30893 345/629 |
| 2013/0332958 | A1* | 12/2013 | Yang | H04N 21/482 725/38 |
| 2014/0006411 | A1* | 1/2014 | Boldyrev | G06F 17/30336 707/741 |
| 2015/0074214 | A1* | 3/2015 | Petersen | G06F 17/30144 709/206 |
| 2017/0249745 | A1* | 8/2017 | Fiala | G06K 9/00671 |

FOREIGN PATENT DOCUMENTS

| | | | | |
|---|---|---|---|---|
| WO | WO-2013079770 | A1 * | 6/2013 | ....... G06F 17/30893 |
| WO | 2014080072 | A1 | 5/2014 | |

OTHER PUBLICATIONS

Radio Map Prefetching for Indoor Navigation in Intermittently Connected Wi-Fi Networks; Andreas Konstantinidis; George Nikolaides; Georgios Chatzimilioudis; Giannis Evagorou; Demetrios Zeinalipour-Yazti; Panos K. Chrysanthis; 2015 16th IEEE International Conference on Mobile Data Management; Year: 2015, vol. 1; pp. 34-43, DOI: 10.1109/MDM.2.*

Rectangularly Multi-Module Memory System with Table-Based Dynamic Addressing Scheme; Jinbo Xu; Yong Dou; Jie Zhou 2008 International Conference on Networking, Architecture, and Storage; Year: 2008; pp. 334-341, DOI: 10.1109/NAS.2008.42.*

The shortest path and spatial decision support system implementation in the context of parcel delivery; Xintong Li; Feng Peng 2010 18th International Conference on Geoinformatics Year: 2010; pp. 1-6.*

A Driver Support Interface to Detect Optical Illusion Places on a Road Map; Koji Kashihara 2015 IEEE International Conference on Systems, Man, and Cybernetics Year: 2015; pp. 1476-1481.*

Point-of-interests based best path selection using cluster-based routing; Ahsan Mustafa; Atif Jan; Sahibzada Ali Mahmud; Zeeshan Shafiq; Gul Muhammad Khan; Muhammad Haseeb Zafar; 2014 11th International Symposium on Wireless Communications Systems (ISWCS) Year: 2014; pp. 690-696.*

Integrated Tourist Navigation System Haomian Wang; Weiwei Cui; Hong Zhou; Yingcai Wu; Huamin Qu 2009 Sixth International Conference on Computer Graphics, Imaging and Visualization Year: 2009; pp. 497-502.*

LandEx—A GeoWeb Tool for Query and Retrieval of Spatial Patterns in Land Cover Datasets; Tomasz F. Stepinski ; Pawel Netzel ; Jaroslaw Jasiewicz; IEEE Journal of Selected Topics in Applied Earth Observations and Remote Sensing Year: 2014 , vol. 7 , Issue: 1;; pp. 257-266. IEEE Journals & Magazines.*

Lasom: Location Aware Self-Organizing Map for discovering similar and unique visual features of geographical locations Dmitry Kit ; Yu Kong ; Yun Fu; 2014 International Joint Conference on Neural Networks (IJCNN) Year: 2014; ; pp. 263-270, IEEE Conferences.*

Pedestrian Navigation—Creating a tailored geodatabase for routing; Birgit Elias; 2007 4th Workshop on Positioning, Navigation and Communication; Year: 2007; pp. 41-47; IEEE Conferences.*

A method for detecting ionospheric disturbances and estimating their propagation speed and direction using a large GPS network James L. Garrison ; See-Chen G. Lee ; Jennifer S. Haase ; Eric Calais; Radio Science Year: 2007 , vol. 42 , Issue: 06; ; pp. 1-21; AGU Journals & Magazines.*

Karam et al., "Uncertain geoinformation representation and reasoning: a use case in LBS integration", 2010 Workshop on Database and Expert Systems Applications (DEXA), Aug. 30-Sep. 3, 2010, retrieved on Nov. 25, 2015 from http://liris.cnrs.fr/Documents/Liris-6766.pdf, 5 Pages.

Karam et al., "Improving Geo-spatial Linked Data with the Wisdom of the Crowds", EDBT/ICDT Third International Workshop on Linked Web Data Management (LWDM 2013), Mar. 22, 2013, retrieved on Nov. 25, 2015 from http://www.researchgate.net/publication/262395471_Improving_geo-spatial_linked_data_with_the_wisdom_of_the_crowds, 7 Pages.

Notification of Transmittal of the International Search Report and The Written Opinion of the International Searching Authority, or The Declaration; International Search Report and Written Opinion for corresponding International Application No. PCT/EP2016/068442, dated Oct. 27, 2016, 14 pages.

Ozgür, "Systematic parking space information (SPSI)", Gründen-Live 2015, published on Aug. 4, 2015, https://www.gruenden-live.de/ideenwettbewerb/6/2278, 8 pages.

* cited by examiner

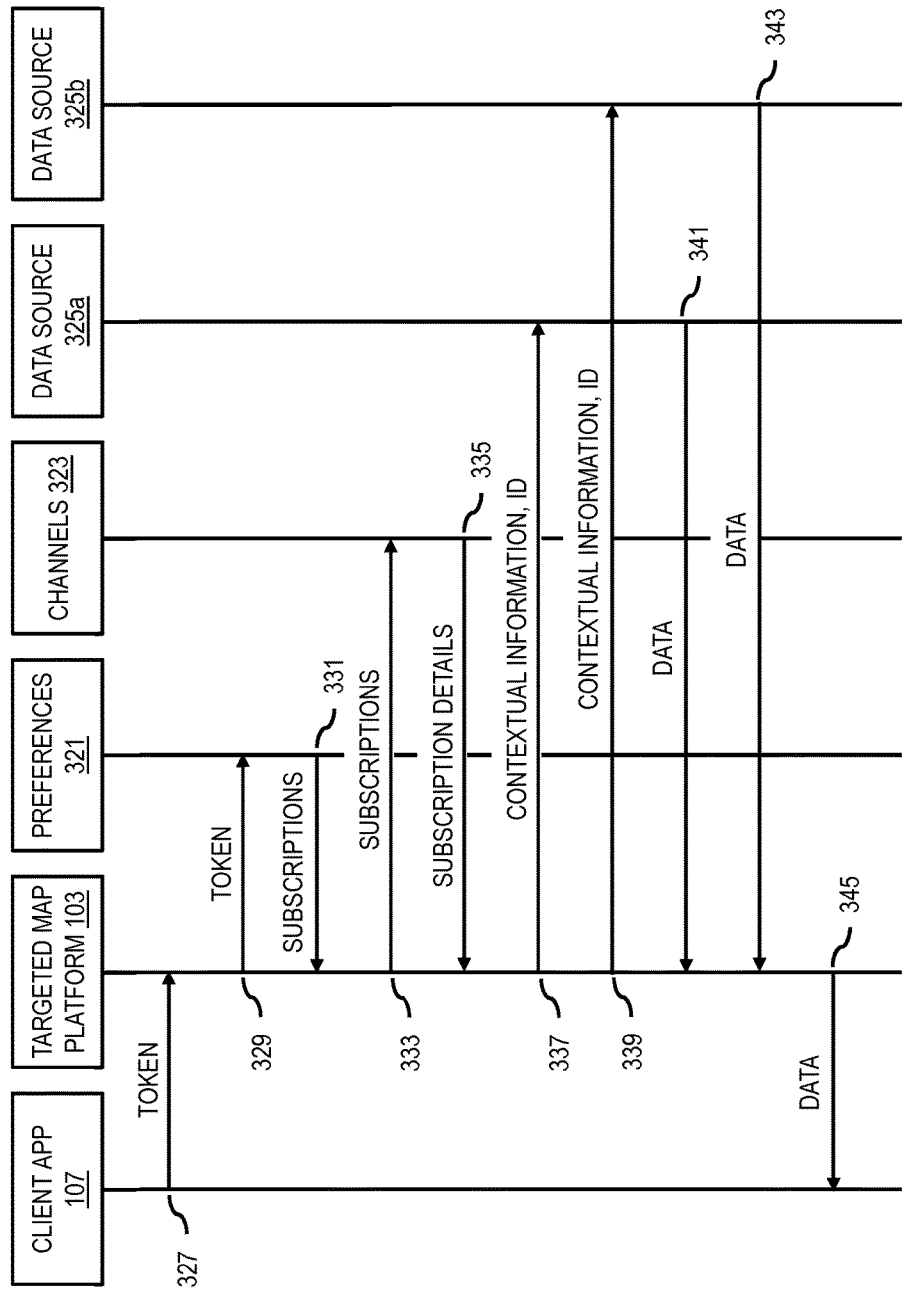

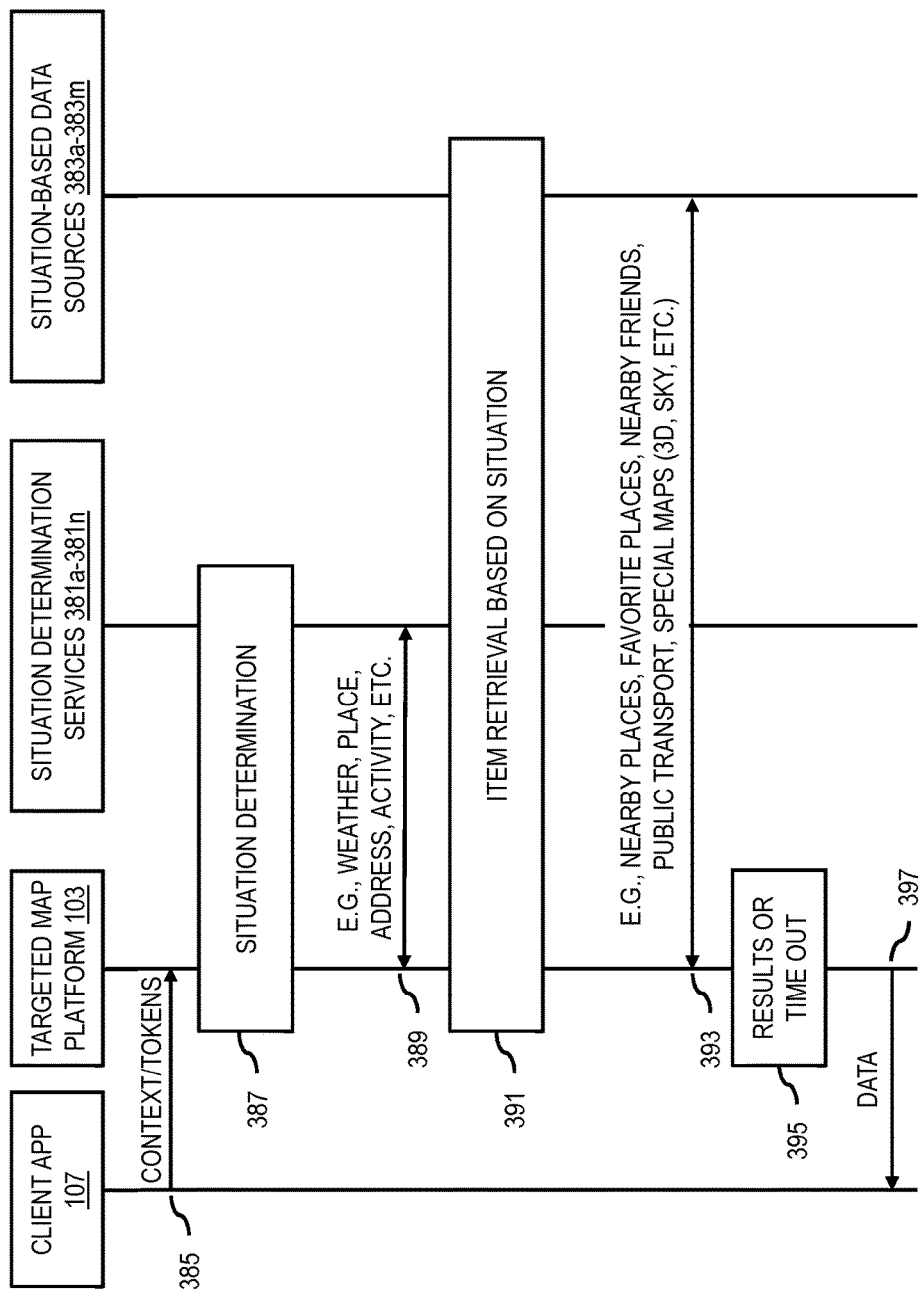

METHOD AND APPARATUS FOR PROVIDING A TARGETED MAP DISPLAY FROM A PLURALITY OF DATA SOURCES

BACKGROUND

Service providers and device manufacturers are continually challenged to deliver value and convenience to consumers by, for example, providing compelling network services. One area of interest has been the development of mapping and location-based services, which has led to a growing proliferation of location-based content available. However, as available content increases so does the number of content providers and services associated with the content. In addition, users can also become overwhelmed with the available content or otherwise find it difficult or burdensome to find location-based content of interest. As a result, service providers face significant technical challenges to tailoring or targeting map displays or other location-based content assembled from a variety of data sources (e.g., content providers and services) according to user interests while also reducing bandwidth and processing requirements for providing such targeted map displays (e.g., maps that present a subset of available content that has been filtered or selected according to content of interest to specific users).

SOME EXAMPLE EMBODIMENTS

Therefore, there is a need for an approach for providing a targeted map display from a plurality of data sources.

According to one embodiment, a method comprises receiving at least one request to provision at least one targeted map display for at least one device based, at least in part, on at least one targeted mapping object. The at least one targeted mapping object includes one or more parameters for retrieving targeted content from a plurality of data sources. The method also comprises determining one or more map item detail records based, at least in part, on the one or more parameters. The one or more map item detail records include payload content assembled from the plurality of data sources about one or more map items. The method further comprises causing, at least in part, a selective updating of the one or more map item detail records based, at least in part, on one or more validity criteria for provisioning the at least one targeted map display.

According to another embodiment, an apparatus comprises at least one processor, and at least one memory including computer program code, the at least one memory and the computer program code configured to, with the at least one processor, cause, at least in part, the apparatus to receive at least one request to provision at least one targeted map display for at least one device based, at least in part, on at least one targeted mapping object. The at least one targeted mapping object includes one or more parameters for retrieving targeted content from a plurality of data sources. The apparatus is also caused to determine one or more map item detail records based, at least in part, on the one or more parameters. The one or more map item detail records include payload content assembled from the plurality of data sources about one or more map items. The apparatus further causes, at least in part, a selective updating of the one or more map item detail records based, at least in part, on one or more validity criteria for provisioning the at least one targeted map display.

According to another embodiment, a computer-readable storage medium carries one or more sequences of one or more instructions which, when executed by one or more processors, cause, at least in part, an apparatus to receive at least one request to provision at least one targeted map display for at least one device based, at least in part, on at least one targeted mapping object. The at least one targeted mapping object includes one or more parameters for retrieving targeted content from a plurality of data sources. The apparatus is also caused to determine one or more map item detail records based, at least in part, on the one or more parameters. The one or more map item detail records include payload content assembled from the plurality of data sources about one or more map items. The apparatus further causes, at least in part, a selective updating of the one or more map item detail records based, at least in part, on one or more validity criteria for provisioning the at least one targeted map display.

According to another embodiment, an apparatus comprises means for receiving at least one request to provision at least one targeted map display for at least one device based, at least in part, on at least one targeted mapping object. The at least one targeted mapping object includes one or more parameters for retrieving targeted content from a plurality of data sources. The apparatus also comprises means for determining one or more map item detail records based, at least in part, on the one or more parameters. The one or more map item detail records include payload content assembled from the plurality of data sources about one or more map items. The apparatus further comprises means for causing, at least in part, a selective updating of the one or more map item detail records based, at least in part, on one or more validity criteria for provisioning the at least one targeted map display.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3B is a sequence diagram of a process for updating a targeted map display including channel subscriptions to data sources, according to one embodiment;

FIG. 3D is a sequence diagram of process for situation determination for a targeted map display, according to embodiment;

DESCRIPTION OF SOME EMBODIMENTS

Examples of a method, apparatus, and computer program for providing a targeted map display from a plurality of data sources are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
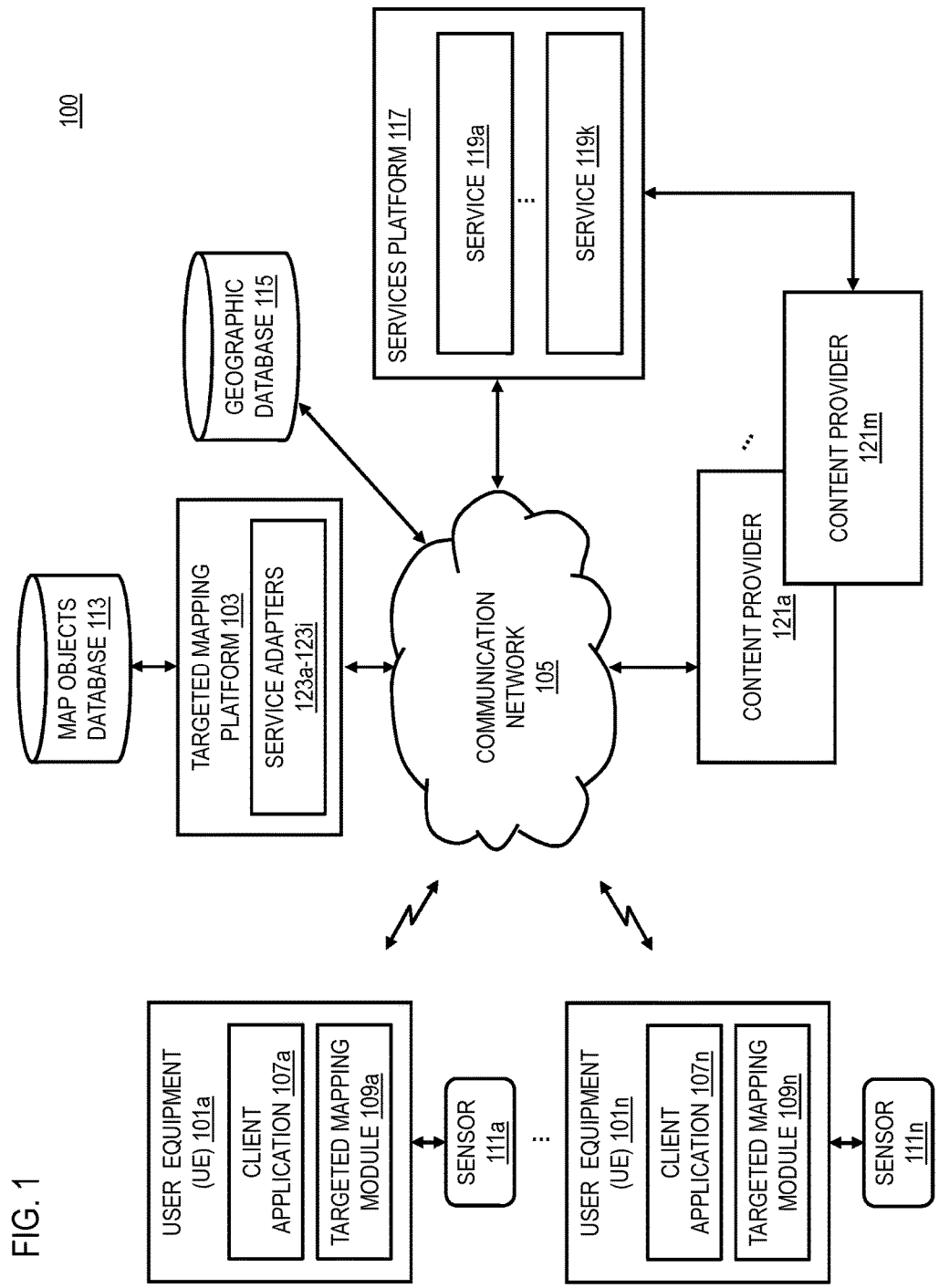
FIG. 1 is a diagram of a system for providing a targeted map display from a plurality of data sources, according to one embodiment.

FIG. 1 is a diagram of a system for providing a targeted map display from a plurality of data sources, according to one embodiment. Because of the number and variety of data sources that can contribute location-based content, an area of a map that is displayed to a user can have an enormous amount of different map items (e.g., points of interest (POIs), map features, and other map elements). However, a majority of the items can potentially be irrelevant to a user who may be interested in a specific purpose for the map, and will hence become obtrusive or burdensome for the user to sift through.

To address this problem, a system 100 of FIG. 1 introduces a capability to provide targeted content (e.g., place descriptions, images, reviews, pricing information, environmental conditions, etc.) for a targeted map display which is tailored to serve a particular purpose or user interest (e.g., film festival in a city, fuel stations nearby with pricing information, restaurants for specific diets, etc.). More specifically, various embodiments of the system 100 address how to efficiently collect and update information about map items (e.g., POIs, features, elements, etc.) from a plurality of heterogeneous data sources (e.g., social network sites, image sharing sites, review sites, etc.) in a dynamic manner to provide a targeted map display to a user.

In one embodiment, the system 100 presents a targeted map or map display by defining a targeted map object. As used herein, a targeted map display refers, for instance, to a map that is tailored or targeted for a specific purpose or user interest. In one embodiment, the targeted map object is a data structure which specifies a set of parameters for focusing the targeted map display for the specific purpose or user interest. By way of illustration and not limitation, the set of parameters can include one or more of the following:

- a map area of interest (e.g., one or more locations, bounding boxes, corridors, paths, etc.);
- one or more types of map items (e.g., POIs) to be presented in the targeted map display;
- one or more lists of specific map items to be presented;
- one or more lists of data sources (e.g., web services) from which to retrieve content for the targeted map display;
- validity criteria for the content or records containing the content (e.g., expiration period for retrieved information such as time to live (TTL); and
- area in which the retrieved information is valid such as a radius from a location).

In one embodiment, any combination or subset of the parameters can be specified for a given targeted map object or targeted map display. In addition or alternatively, other different parameters that are suitable for a given targeted map can be specified. For example, nearby sports scores can be provided for maps tailored to sports activities; nearby job listings can be posted for maps tailored for job seekers; etc. In one embodiment, because the targeted map object contains the parameters for retrieving content that is targeted for a specific purpose or interest and not the content itself, the targeted map object is compact and efficient to transmit.

In one embodiment, as a targeted map is produced for a specific purpose or user interest, the system 100 can also tailor the description and/or other related content (e.g., images, media, etc.) for map items that are presented in the targeted map. In one embodiment, the system 100 introduces the map item detail record that assembles payload content retrieved from heterogeneous data sources for presentation to the user. By way of illustration and not limitation, the map item detail record is a data record with the following characteristics or data fields:

item identification information;
location information;
validity criteria (e.g., expiration period and/or validity area/radius); and
payload content consisting of accumulated information retrieved from different data sources (e.g., web services).

It is noted that the system 100 can use any combination or subset of the above data fields, or use other data fields not listed depending on the targeted map or its associated purpose. In one embodiment, the values for the data fields can be inherited from their containing targeted map object or specified on a per-record basis. In one embodiment, the map item detail records can include any data item used by the system 100, but not limited to payload content assembled from a plurality of heterogeneous data sources that are related to one or more map items presented in a targeted map display. In other words, the map item detail record provides content or information about a map item that is presented in a targeted map display.

Because of the nature of the payload content in the map item detail record, the system 100 can periodically and/or selectively update the content to ensure that the information in the map item detail records remains up-to-date. For example, payload content such as event information may have a finite useful time period (e.g., information for a particular event is no longer needed after the event concludes, weather information can become outdated, etc.). In one embodiment, the system 100 uses the validity criteria specified in the map item detail record and/or the targeted map object to determine when and what content/fields need updating for a given record. In embodiment, to advantageously reduce data or bandwidth consumption as well as reduce remote service calls from a client, the system 100 can apply different validity criteria and/or update schedules on a record-by-record or field-by-field basis to dynamically update or generate the map item detail records.

In one embodiment, the system 100 uses an item description container as the user interface representation (e.g., a visual representation, an audio representation, a multi-media representation, haptic representation, etc.) of a map item detail record. In one embodiment, the system 100 can vary the exact representation of map item detail record based on, for instance, the presenting device, contextual information, etc. By way of example, the item description container may specify formatting parameters for presenting payload content from a map item detail record. For example, if a map item is a place, the item description container may specify a first section for images, a second section for operating hours, a third section for description information, and a forth section for reviews. Content used to populate each section can come from multiple heterogeneous data sources. The formatting parameters (e.g., layout, fonts, highlights, etc.) can then be used, for instance, to produce a consistent look for the heterogeneous content as well as to adapt the presentation for different devices (e.g., a simpler mobile format for handheld devices and a more complex or intricate format for desktop/laptop devices).

In one embodiment, the map item detail records underlying the content presented via item description containers can be provisioned by service calls (e.g., API calls) to retrieve targeted information for the plurality of available data sources. In addition or alternatively (e.g., to reduce bandwidth consumption or remote service calls), the item detail records can be provisioned from a local cache of the UE 101 or other client if the information in the cache is available and/or valid. As described previously, validity can be determined based on validity criteria including, for instance, expiration times (e.g., set on a record-by-record basis) and/or distance from a location (e.g., within a radius from an effective location for the cached content). Additional description of caching information for targeted map displays is provided in more detail below.

As shown in FIG. 1, in one embodiment, the system 100 uses an architecture comprising one or more user equipment (UE) 101*a*-101*n* (also collectively referred to as UEs 101) with connectivity to a targeted mapping platform 103 over a communication network 105. In one embodiment, the UEs 101 execute one or more client applications 107*a*-107*n* (also collectively referred to as client applications 107) for accessing the targeted mapping functions of the targeted mapping platform 103. In one embodiment, the client applications 107 may be a dedicated client application or can include general applications (e.g., browsers, navigation applications, mapping applications, and/or other location-based applications) that can present or otherwise interact with the embodiments of the targeted map display described herein. In other words, the client application 107 can be installed on any computing device, be it mobile phone, infotainment system, browser-based application, etc. Additional description of applicable client hardware is provided below.

In addition or alternatively, the UEs 101 can include targeted mapping modules 109*a*-109*n* (also collectively referred to as targeted mapping modules 109) that are software and/or hardware modules integrated into the UE 101 (e.g., as operating system components, middleware, libraries, application programming interfaces (API), firmware, etc.). In one embodiment, the targeted mapping modules 109 can provide targeted mapping functions locally at the device or act as an intermediate or service node between the client application 107/UE 101 and the targeted mapping platform 103. In one embodiment, the UEs 101 may be configured with or have access to sensors 111*a*-111*n* (also collectively referred to as sensors 111) for collecting contextual information (e.g., current location, time, environmental condition, activity, etc.) for use in presenting targeted map displays. For example, sensors 111 may be used as satellite-based location receivers (e.g., Global Positioning System (GPS) receivers) for interacting with one or more positioning satellites to determine and track the current speed, position and location of a vehicle travelling along a roadway. In addition, the sensors 111 may gather tilt data (e.g., a degree of incline or decline of the vehicle during travel), motion data, light data, sound data, image data, weather data, temporal data and other data associated with the UEs 101. Still further, the sensors 111 may detect local or transient network and/or wireless signals, such as those transmitted by nearby devices during navigation of a vehicle along a roadway.

In one embodiment, the client applications 107 and/or the targeted mapping modules 109 can request targeted map displays by installing or retrieving a targeted map object from, for instance, the map objects database 113 (e.g., an online targeted map object repository) or any other source (local or network) to generate service calls to the targeted mapping platform 103. For example, a user may be presented with a catalog of targeted map objects associated with a variety of purposes and/or interests for selection, downloading, installation, etc. In one embodiment, the targeted mapping platform 103 can access mapping data (e.g., POIs, geographic coordinates, geocoding, reverse geocoding, etc.) from a geographic database 115 to facilitate presentation of a targeted map display. The geographic database 115 also contains, for instance, travel network (e.g., road network) information including, for instance, a complete set of POI related data from which a targeted map display can be extracted.

In one embodiment, the targeted mapping platform 103 has connectivity to a plurality of heterogeneous data sources for retrieving payload content for targeted map displays. As shown in FIG. 1, the data sources can include both first party and third party data sources including, the services platform 117 consisting of one or more location-based content services 119a-119k (also collectively referred to as services 119), as well as content providers 121a-121m (also referred to as content providers 121). In one embodiment, the targeted mapping platform 103 connects to the service platform 117, the services 119, and/or the content providers 121 user APIs (e.g., REST APIs) or similar interfaces. In one embodiment, in order to utility third party APIs, the targeted mapping platform 103 can use respective service adapters 123a-123i (e.g., microservice adapters; also collectively referred to as service adapters 123).

By way of example, the service adapters 123 translate the service calls and replies from the respective services 119 and/or content providers 121 into a formatted payload that can then be aggregated and delivered to the client application 107 via, for instance, the targeted mapping platform 103's REST API. In one embodiment, the service adapters 123 are provided for each service 119 and/or content provider 121 as needed to facilitate communication between the services 119, the content providers 121, and the targeted mapping platform 103. Table 1 below contains a sample response for a service call to the image sharing site, Instagram®; and Table 2 contains the formatted response from a service adapter 124 attached to the Instagram® API.

TABLE 1

```
{
  "meta": {
    "code": 200
  },
  "data": [{
    "attribution": null,
    "tags": [ ],
    "location": {
      "latitude": 52.521451568,
      "name": "Alexanderplatz Berlin",
      "longitude": 13.411867776,
      "id": 213645520
    },
    "comments": {
      "count": 0,
      "data": [ ]
    },
    "filter": "Normal",
    "created_time": "1438936297",
    "link": "https://instagram.com/p/6E1axqmjca/",
    "likes": {
      "count": 0,
      "data": [ ]
    },
    "images": {
      "low_resolution": {
        "url": "https://scontent.cdninstagram.com/hphotos-xfa1/t51.2885-15/s320x320/e15/11283245_1479241569052822_1353006348_n.jpg",
        "width": 320,
        "height": 320
      },
      "thumbnail": {
        "url": "https://scontent.cdninstagram.com/hphotos-xfa1/t51.2885-15/s150x150/e15/11283245_1479241569052822_1353006348_n.jpg",
        "width": 150,
        "height": 150
      },
      "standard_resolution": {
        "url": "https://scontent.cdninstagram.com/hphotos-xfa1/t51.2885-15/s640x640/sh0.08/e35/11283245_1479241569052822_1353006348_n.jpg",
        "width": 640,
        "height": 640
      }
    },
    "users_in_photo": [ ],
    "caption": {
      "created_time": "1438936297",
      "text": "☺",
```

TABLE 1-continued

```
    "from": {
      "username": "user1",
      "profile_picture": "https://igcdn-photos-b-a.akamaihd.net/hphotos-ak-xaf1/t51.2885-19/11379802_1495786477378145_2051504746_a.jpg",
      "id": "324616676",
      "full_name": "User 1"
    },
    "id": "1046195954779829367"
   },
   "type": "image",
   "id": "1046195949956380442_324616676",
   "user": {
     "username": "user1",
     "profile_picture": "https://igcdn-photos-b-a.akamaihd.net/hphotos-ak-xaf1/t51.2885-19/11379802_1495786477378145_2051504746_a.jpg",
     "id": "324616676",
     "full_name": "User 1"
   }
  }]
}
```

TABLE 2

```
{
  "meta": {
    "code": 200,
    "apiVersion": 3
  },
  "response": {
    "items": [{
      "id": "1046195949956380442_324616676",
      "type": "image",
      "name": "Alexanderplatz Berlin",
      "position": {
        "latitude": 52.521451568,
        "longitude": 13.411867776
      },
      "details": {
        "thirdPartyIds": [ ],
        "images": [{
          "url": "https://scontent.cdninstagram.com/hphotos-xfa1/t51.2885-15/s640x640/sh0.08/e35/11283245_1479241569052822_1353006348_n.jpg"
        }],
        "actions": [{
          "label": "View on Instagram",
          "payload": {
            "action": "OPEN",
            "uri": "https://instagram.com/p/6E1axqmjca/"
          }
        }],
        "texts": ["☺"],
        "galleries": [{
          "items": [{
            "url": "https://igcdn-photos-b-a.akamaihd.net/hphotos-ak-xaf1/t51.2885-19/11379802_1495786477378145_2051504746_a.jpg"
          }]
        }]
      },
      "marker": {
        "type": "image",
        "imageUrl": "https://scontent.cdninstagram.com/hphotos-xfa1/t51.2885-15/s150x150/e15/11283245_1479241569052822_1353006348_n.jpg"
      },
      "relevance": {
        "radius": 500,
        "expires": 1438940871709
      }
    }]
  }
}
```

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, infotainment system, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the targeted mapping platform 103 may be implemented as a cloud based service, hosted solution or the like for performing embodiments of the functions described herein. Alternatively, the targeted mapping platform 103 may be directly integrated for processing data generated and/or provided by the service platform 117, the services 119, and/or content providers 121.

By way of example, the UEs 101, targeted mapping platform 103, the service platform 117, the services 119, and/or the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
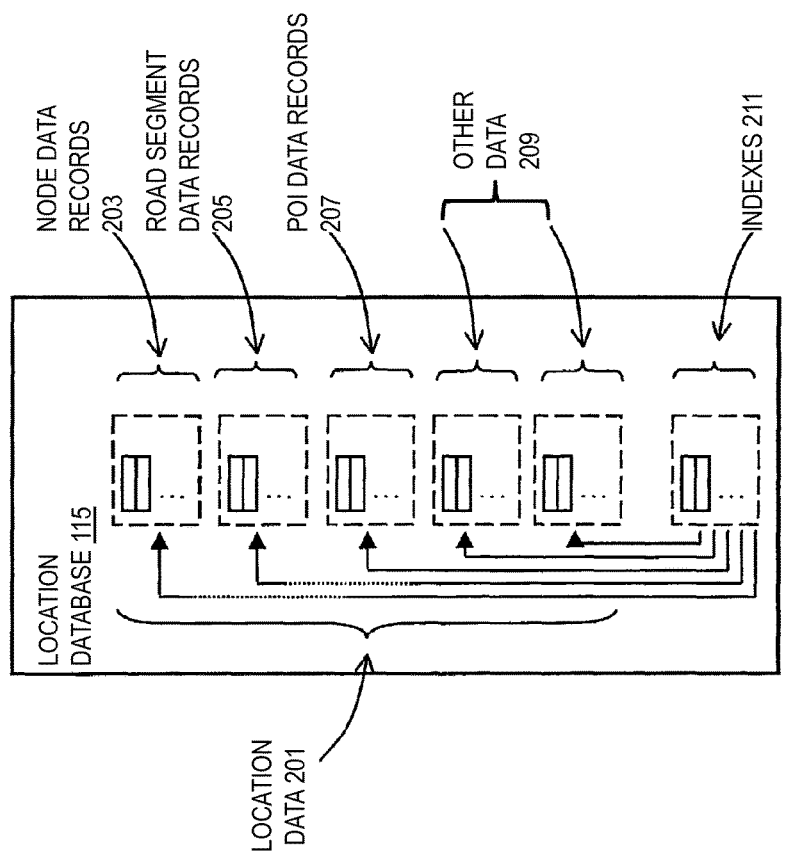
FIG. 2 is a diagram of a geographic database, according to one embodiment.

FIG. 2 is a diagram of the geographic database 115, according to one embodiment. In one embodiment, mapping and other information related to providing targeted map displays from a plurality of data sources can be stored, associated with, and/or linked to the geographic database 115 or data thereof. In one embodiment, the geographic or map database 115 includes location data 201 used for (or configured to be compiled to be used for) location-based services including mapping and/or navigation-related services for providing for map displays, route information, service information, estimated time of arrival information, location sharing information, speed sharing information, and/or geospatial information sharing, according to exemplary embodiments. For example, the geographic database 115 includes node data records 203, road segment or link data records 205, POI data records 207, other data records 209, and record indexes 211, for example. More, fewer or different data records can be provided. In one embodiment, the other data records 211 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI data records 207 may also include information on locations of traffic controls (e.g., stoplights, stop signs, crossings, etc.).

In exemplary embodiments, the road segment data records 205 are links or segments representing roads, streets, or paths, as can be used in the calculated route or recorded route information. The node data records 203 are end points corresponding to the respective links or segments of the road segment data records 205. The road link data records 205 and the node data records 203 represent a road network, such as used by vehicles, cars, and/or other entities. Alternatively, the geographic database 115 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 115 can include data about the POIs and their respective locations in the POI data records 207. The geographic database 115 can also include data about places, such as cities, towns, or other communities, and other geographic features, such as bodies of water, mountain ranges, etc. Such place or feature data can be part of the POI data 207 or can be associated with POIs or POI data records 207 (such as a data point used for displaying or representing a position of a city).

The geographic database 115 can be maintained by the content provider in association with the service platform 117 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database 115 or data in the master geographic database 115 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 115 can be a master geographic database, but in alternate embodiments, the geographic database 115 can represent a compiled mapping and/or navigation database that can be used in or with end user devices (e.g., UEs 101) to provided location-related functions. For example, the geographic database 115 can be used with the end user device 101 to provide an end user with navigation or mapping features. In such a case, the geographic database 115 can be downloaded or stored on the end user device UE 101, such as in a local cache database, client applications 107, or the end user device UE 101 can access the geographic database 115 through a wireless or wired connection (such as via a server and/or the communication network 105), for example.

Figure 3A:
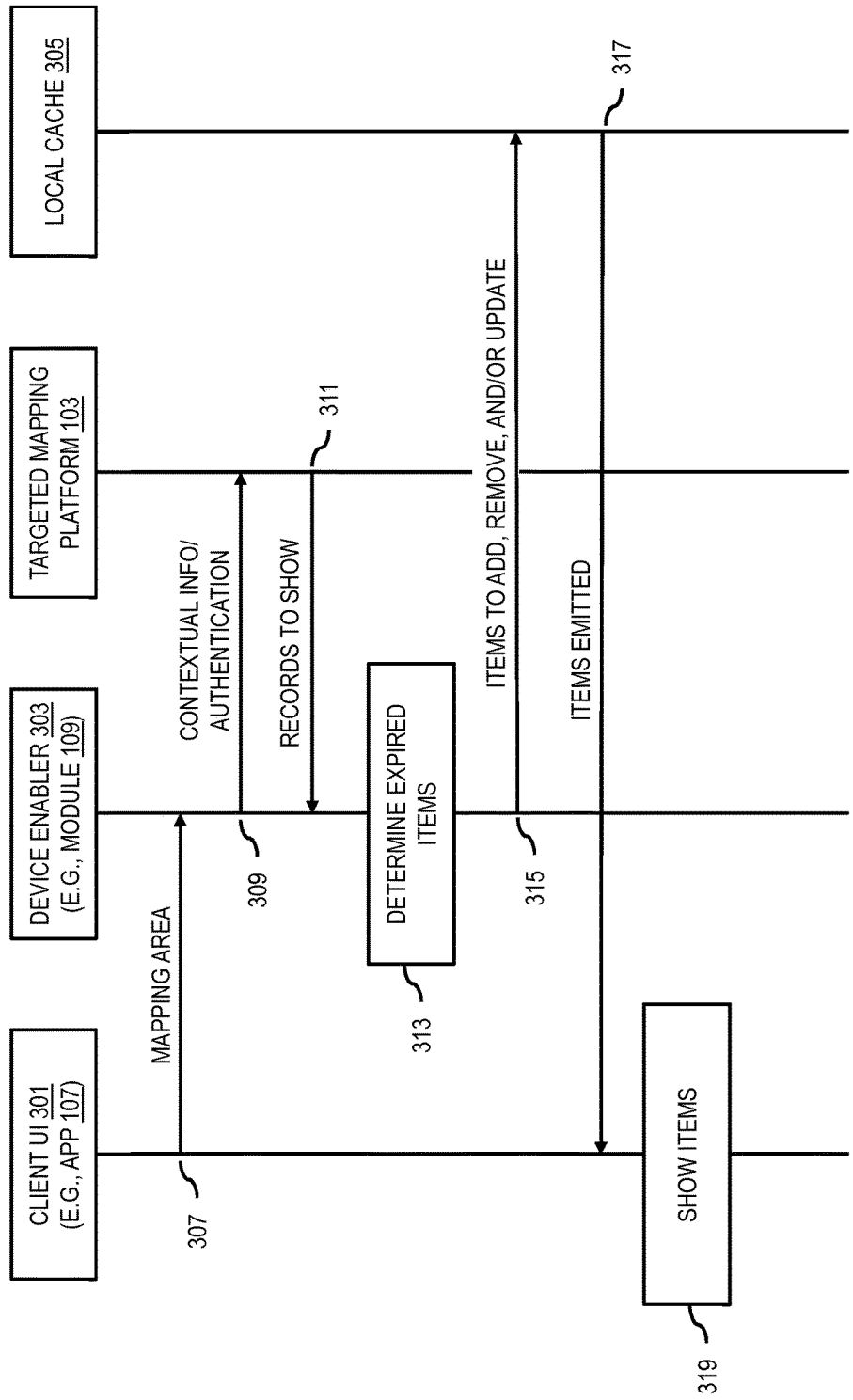
FIG. 3A is a sequence diagram of a general process for client interaction with the targeted mapping platform, according to one embodiment.

FIG. 3A is a sequence diagram of a general process for client interaction with the targeted mapping platform, according to one embodiment. In the example of FIG. 3A, the components involved in the interaction between the client application 107 and the targeted mapping platform 103 include: (1) a client user interface (UI) 301, e.g., associated with the client application 107; (2) a device enabler 303, e.g., associated with the targeted mapping module 109; (3) the targeted mapping platform 103; and (4) a local cache 305, e.g., local to the UE 101 executing the client application 107.

In one embodiment, the client UI 301 is for displaying a targeted map display along with descriptions/content of relevant map items (e.g., as determined by the parameters specified in the targeted map object used to generate the display). In one embodiment, the currently viewed portion of a map displayed in the client UE 301 can be used to determine which item descriptions (e.g., place descriptions) are relevant at a given time, thereby narrowing the set of map item detail records that may need to be updated and saving bandwidth and/or resources. By way of example, the center point of the viewed portion can be as the parameter for defining a relevant area for item descriptions. Alternatively, the currently viewed area can be used as a bounding box. In yet another embodiment, a specified route or path can be used as a corridor to define a relevant area. It is contemplated that any means can be used to define a relevant mapping area with respect to the client UI 301. In process 307, after defining the mapping area, the client UI 301 transmits the mapping area to the device enabler 303.

In one embodiment, the device enabler 303 issues calls to the targeted mapping platform 103 (e.g., the REST APIs of the targeted mapping platform 103) in response to requests from the client UI 301 to retrieve the items to be displayed in the client UE 301. In one embodiment, the device enabler 303 provides contextual information (e.g., the relevant mapping area, temporal information, environmental information, activity information, etc.) to the targeted mapping platform 103 to request content assembled form a plurality of data sources that is tailored to the requested targeted map object (e.g., satisfying the parameters specified targeted map object) (process 309).

In response to the calls, the targeted mapping platform 103 evaluates the parameters specified in the targeted map object associated with the request along with the provided contextual information and relevant mapping area to identify item detail records that are responsive to the request and should be shown in the client UI 301 (process 311). In one embodiment, the targeted mapping platform 103 can transmit a list of the record IDs to show rather than the records themselves to reduce bandwidth and resource usage.

In process 313, the device enabler 303 then processes the list of records to determine whether any or all of the records are available in the local cache 305 and are still valid (e.g., not expired). Based on a search of the local cache, the device enabler can determine which items to add, remove, and/or update in the local cache in a dynamic or selective updating process (process 315). For example, records or items that are in the local cache 305 and are valid (e.g., not expired and/or within a valid radius) need not be updated. Accordingly, the device enabler 303 need only request updates for invalid records or records not in the local cache 305 instead of updating the entire list of records to show, thereby reducing bandwidth and/or resource usage. In other words, the local cache 305 stores item detail records locally on the client side to avoid unnecessary calls to the targeted mapping platform 103 and/or associated data sources.

In one embodiment, the device enabler 303 then issues update calls to the plurality of data sources as needed based on inspection of local cache 305. In one embodiment, the update calls are passed to the targeted mapping platform 103 to process the updates via the service adapters 123 as previously described. In one embodiment, the device enabler 303 can be configured to handle user authentication credentials for third party data services (e.g., via an authentication token) to facilitate retrieving content from protected data sources (e.g., authentication tokens to social networking sites with relevant location-based content). For example, the device enabler 303 can pass the authentication token to the targeted mapping platform 103 with the update request.

In process 317, after all updates are completed or update requests time-out, the local cache 305 emits the requested records to the client UI 301. On receiving the records, the client UI 301 can show the items using associated item description containers. In one embodiment, the records (e.g., map item detail records) are transmitted from the targeted mapping platform 103 to the client UI 301, which then renders the payload content in the records using a map item description container that resides or is accessed locally at the client UI 301. This, in turn, reduces load on the network 105 by only transmitting the content (e.g., via the map item detail records) and letting the client UI 301 or device perform the formatting and/or presentation of the content.

In summary, in one embodiment, during normal operation, the client UI 301 determines the mapping area of interest (e.g., based on the center of the currently viewed portion of the map or other means for selecting a relevant mapping area). This information is forwarded to the device enabler 303, so that it can assemble an API call. In one embodiment, the device enabler 303 performs an API call to the targeted mapping platform 103 using the established mapping area and the parameters relevant to a particular targeted map object. For example, the parameters can include which data sources are to be contacted, which items (e.g., POIs) or types of items are relevant, additional contextual information, and/or other relevant data/parameters.

In one embodiment, when the device or client enabler 303 contacts targeted mapping platform 103 with the contextual information, the device enabler 303 can include authentication information and/or a list of specific data sources. By way of example, this information is used by the targeted mapping platform 103 to determine which data source should be contacted. In one embodiment, the targeted mapping platform 103 maintains a registry of the full details required to access external data sources although, in some embodiments, this can be enhanced with information specifically from the client application 107.

FIG. 3B is a sequence diagram of a process for updating a targeted map display including channel subscriptions to data sources, according to one embodiment. The components illustrated in FIG. 3B include: (1) the client application 107; (2) the targeted mapping platform 103; (3) a user preferences database 321; (3) a content channels database 323; (4) an internal data source 325a; and (5) an external data source 325b.

In process 327, the client application 107 initiates a subscription-based targeted content request by forwarding an authentication token for the access to the user preferences database 321 to the targeted mapping platform 103. The targeted mapping platform 103 then issues a request for the user's relevant content subscription information from the preferences database 321 with the request including the provided authentication token (process 329).

In process 331, the preferences database 321 authenticates the request and returns information on the relevant subscriptions. In this example, the preferences database 321 returns information indicating that the relevant content subscriptions are associated with the internal data source 325a and an external resource 325b.

In process 333, the targeted mapping platform 103 then initiates a request for the subscription details (e.g., subscription parameters, IDs, etc.) from the content channels database 323. In return, the content channels database 323 returns the addresses (e.g., URLs) of the requested data sources 325a and 325b including any associated request parameters.

In processes 337 and 339, the targeted mapping platform 103 issues respective calls with respective contextual information, IDs, and/or any other call parameters to the data sources 325a and 325b. The data sources 325a and 325b processes the calls and respectively return relevant data (processes 341 and 343). The targeted mapping platform 103 then populates the relevant item detail records with the payload data or content for transmission to the client application 107 for presentation (process 345).

Figure 3C:
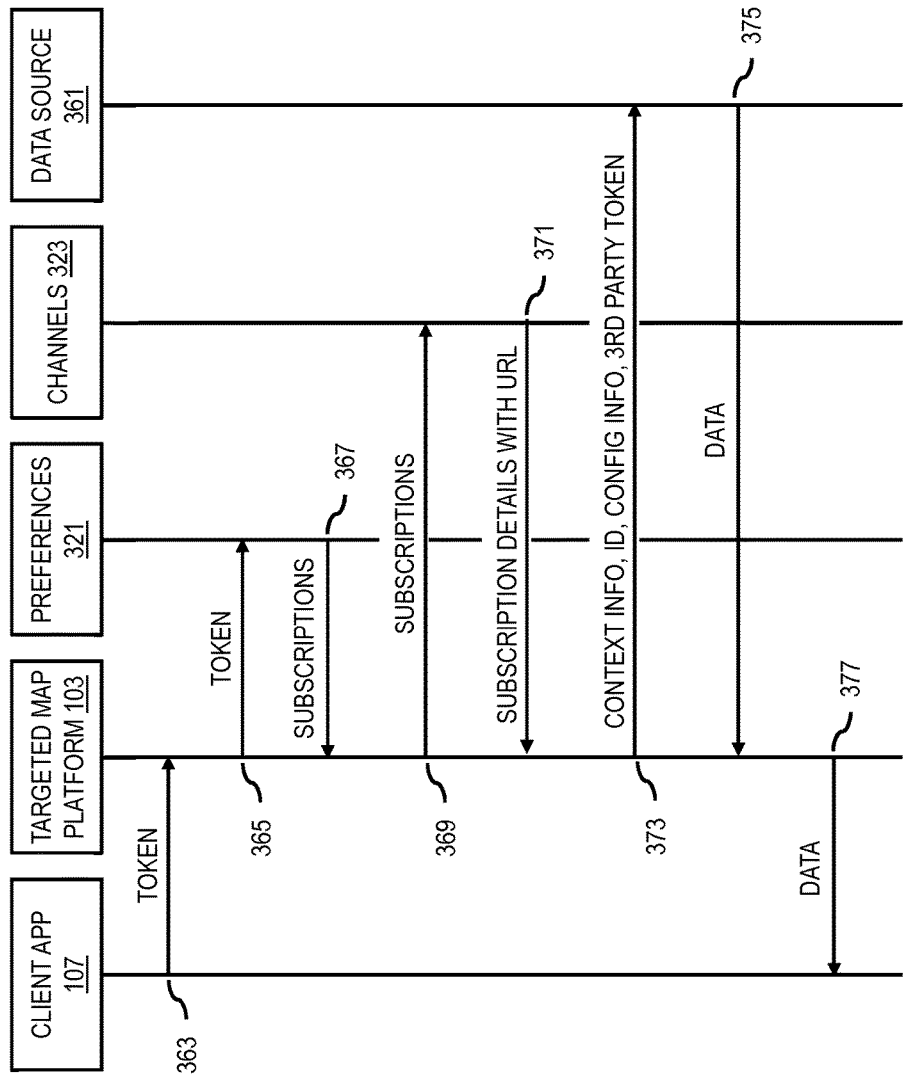
FIG. 3C is a sequence diagram of a process for updating a targeted map display including channel subscriptions based on a third-party server, according to one embodiment.

FIG. 3C is a sequence diagram of a process for updating a targeted map display including channel subscriptions based on a third-party server, according to one embodiment. More specifically, the example FIG. 3C illustrates retrieving payload content from a third party data source that requires third-party authentication. The components illustrated in FIG. 3C include: (1) the client application 107; (2) the targeted mapping platform 103; (3) the user preferences database 321; (3) the content channels database 323; and (4) a third party data source 361.

Some data sources (e.g., data source 361) may not respond with information without authentication and authorization. For example, a third-party calendar service may require an authentication token to be provided by the user before responding with event and location information. In one embodiment, the client application 107 may provide a secure token to the targeted mapping platform 103 (process 363).

In process 365, the targeted mapping platform 103 can then initiate looking up third-party specific tokens in an online registry by first querying the preferences database 321 for relevant subscription information. The preferences database 321 identifiers the relevant subscription to the targeted mapping platform 103 in process 367. The targeted mapping platform 103 then uses the returned subscription information to request subscription details including the third party authentication token for the user from the channels database 323 (process 369).

In process 371, the channels database 323 returns the subscription details including the request third party token and associated server address (e.g., URL of the third party data source) to the targeted mapping platform 103. The targeted mapping platform forwards the contextual information, ID, configuration information, third party token, and/or any other relevant parameter/information in a call to the data source 361 using the provided server address (process 373).

In process 375, the data source 361 returns the requested data to the targeted mapping platform 103, which then populates the data into the associated item detail records for transmission to the client application 107 (process 377).

FIG. 3D is a sequence diagram of process for situation determination for a targeted map display, according to embodiment. As previously described, the embodiments of the targeted map display approach described herein aims to combine different sources of information. However, doing so generally involves multiple API calls to multiple data sources, which can be significantly resource intensive. Therefore, in one embodiment, the targeted mapping platform 103 uses dynamic provisioning based on situation or context determination to trigger provisioning or updating of targeted content that is assembled from a plurality of data sources.

The example of FIG. 3D includes the following components: (1) the client application 107; (2) the targeted mapping platform 103; (3) one or more situation or context determination services 381a-381n (also collectively referred to as context determination services 381); and (4) situation-based data sources 383a-383m (also collectively referred to as situation-based data sources 383).

In one embodiment, data sources (e.g., situation-base data sources 383) can use additional context or situation information (e.g., weather, time-of-day, proximity to an airport, etc.) to narrow the range of targeted content that is to be provided. For example, a data source may contain information about a place which is closed at the time the user makes the request to display a targeted map. In this case the data source can optionally choose not to return this place or map item in its payload content. Similarly, a data source may return item information only when the weather is sunny, for instance.

In one embodiment, using this targeted approach, calls to dynamically provision a targeted map display (e.g., via an item description container to present targeted content from item detail records) are only performed when necessary and relevant to a specific targeted map display or object. In one embodiment, the additional use of validity criteria (e.g., expiration times, Time-to-Live, data validity distances, etc.) further optimizes such calls, as it advantageously avoids provisioning targeted map displays or item detail records when their content is still valid.

The process of FIG. 3D illustrates an example of dynamic provisioning based on context or situation determination. In process 385, the client application 107 establishes a mapping area of interest in a targeted map display (e.g., center point of a current view of the map display) and initiates a request with the mapping area and/or any other determined context to the targeted mapping platform 103.

In process 387, the targeted mapping platform 103 interacts with one or more of the situation determination services 381 to identify additional contexts or situations associated with the client application 107 and/or the associated UE 101. By way of example, the situation determination services can include a weather service, a reverse geocoding service, a place determination service (e.g., to identify whether a device's current location is at an identifiable place such as an airport), activity monitoring service, and/or the like. The additional situations or contexts (e.g., weather, place, address, activity, etc.) is then returned to the targeted mapping platform 103 (process 389). For example, the targeted mapping platform 103 can query the situation determination services 381 to determine: (1) current weather conditions?—response: current weather at the user's location from weather service; (2) where am I?—response: current address from reverse geocoding; and (3) am I near an airport?—response: No/Yes from place determination service.

In process 391, the targeted can then initiate retrieval of situation-based targeted content from one or more situation-based data sources 383 (e.g., place determination service, mapping service, social networking service, public transport service, etc.). For example, the targeted mapping platform 103 can retrieve item detail records for the following queries: (1) places nearby?—response: nearby places from places determination service; (2) user favorites nearby?—response: nearby favorite places from personalized mapping service; (3) friends checked in here?—response: No/Yes from social networking service; (4) train stations nearby?—response: nearby train stations from places determination service; (4) departures from stations?—response: upcoming departures from public transport service; and (5) three-dimensional maps nearby?—response: No/Yes from mapping service. The queries above are provided as illustrations and not as limitations. It is contemplated that any situation-based data source is applicable to the embodiments described herein.

In process 395, the targeted mapping platform 103 assembles the resulting targeted content or waits until a predetermined time-out period before returning any collected content and any determined contexts/situations to the client application 107 for presentation to the user (process 397).

Figure 4:
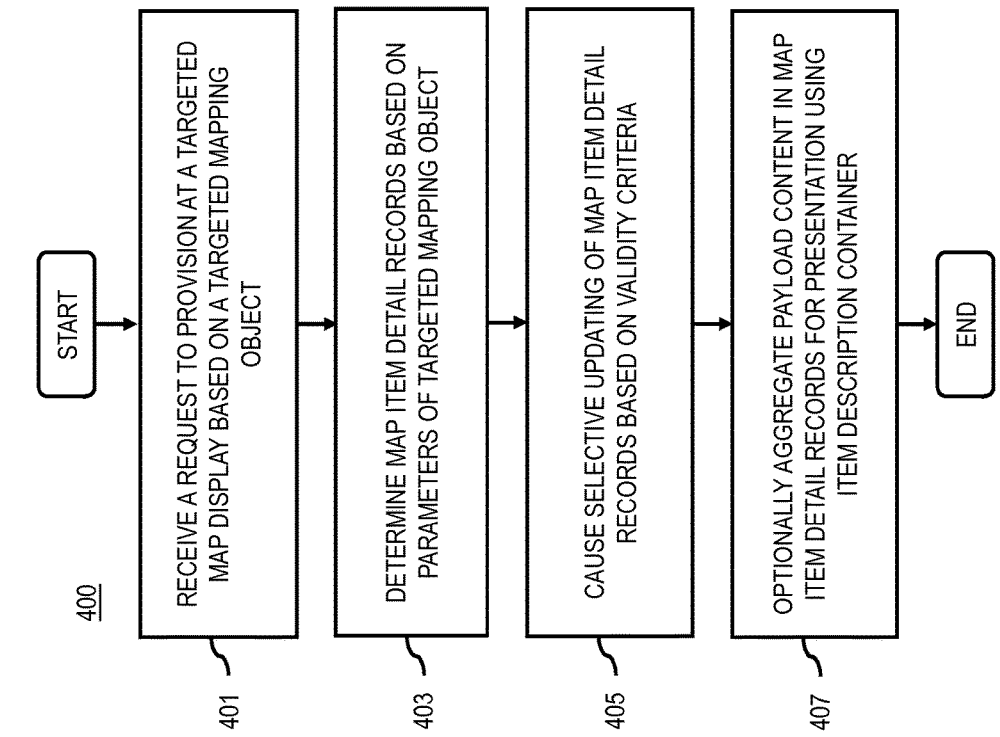
FIG. 4 is a flowchart of a process for providing a targeted map display from a plurality of data sources, according to one embodiment.
Figure 10:
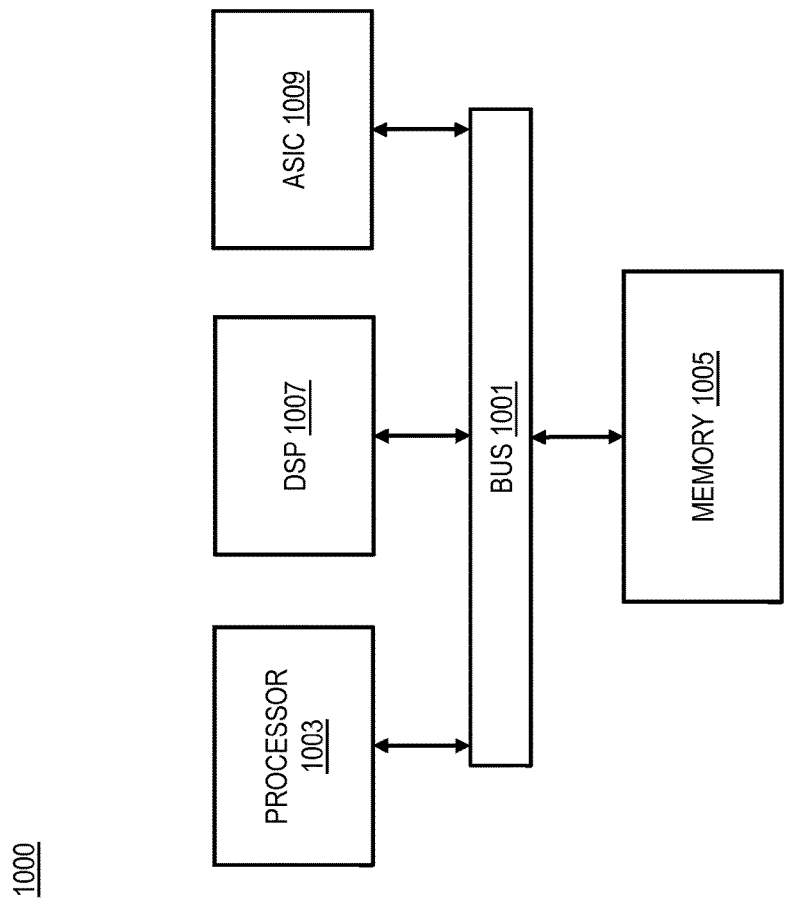
FIG. 10 is a diagram of a chip set that can be used to implement an embodiment of the invention.

FIG. 4 is a flowchart of a process for providing a targeted map display from a plurality of data sources, according to one embodiment. In one embodiment, the targeted mapping platform 103 performs the process 400 and is implemented in, for instance, a chip set including a processor and a memory as shown in FIG. 10. In addition or alternatively, all or a portion of the process 400 may be performed locally at the UE 101 (e.g., via the client application 107, the targeted mapping module 109, or another equivalent hardware and/or software component).

In step 401, the targeted mapping platform 103 receives at least one request to provision at least one targeted map display for at least one device based, at least in part, on at least one targeted mapping object, wherein the at least one targeted mapping object includes one or more parameters for retrieving targeted content from a plurality of data sources. In one embodiment, the one or more parameters of the at least one targeted map object includes one or more map areas of interest, one or more targeted map items, one or more types of targeted map items, targeted location-based content, one or more lists of the plurality of data sources to target, the one or more validity criteria, or a combination thereof.

In step 403, the targeted mapping platform 103 determines one or more map item detail records based, at least in part, on the one or more parameters, wherein the one or more map item detail records include payload content assembled from the plurality of data sources about one or more map items.

In step 405, the targeted mapping platform 103 causes, at least in part, a selective updating of the one or more map item detail records based, at least in part, on one or more validity criteria for provisioning the at least one targeted map display.

In one embodiment, the targeted mapping platform 103 optionally determines contextual information associated with the at least one targeted map display, the at least one device, or a combination thereof, wherein the determining of the one or more item detail records, the selective updating of the one or more map item detail records, the provisioning of the at least one map display, or a combination thereof is further based, at least in part, on the contextual information. In one embodiment, the contextual information includes a currently viewed area of the at least one map display, weather information, location information, temporal information, activity information, or a combination thereof.

In step 407, the targeted mapping platform 103 causes, at least in part, an aggregation of the payload content for storage in, for instance, a map item detail record. In one embodiment, the targeted mapping platform 103 then uses or causes to be used at least one item description container to present the payload content stored in the at least one map item detail record in the at least one targeted map display. This presentation, for instance, represents description information for the one or more items.

Figure 5:
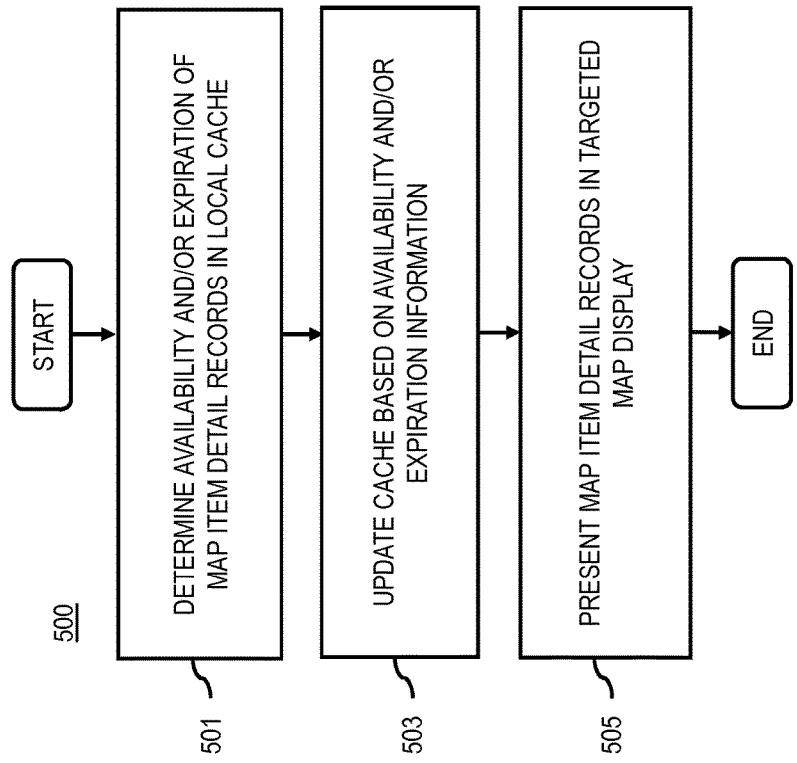
FIG. 5 is a flowchart of a process for providing a content for a targeted map display from a local cache, according to one embodiment.

FIG. 5 is a flowchart of a process for providing a content for a targeted map display from a local cache, according to one embodiment. In one embodiment, the client application 107 and/or the targeted mapping module 109 performs the process 500 and is implemented in, for instance, a chip set including a processor and a memory as shown in FIG. 10. In addition or alternatively, all or a portion of the process 500 may be performed remotely by the targeted mapping platform 103.

As previously noted, because embodiments of the targeted map display discussed herein are based on assembling targeted content into map item detail records from a plurality of data sources, the client application 107 can employ a local cache to facilitate dynamically provisioning and/or selectively updating only the item records that are not valid or not available in the local cache.

In step 501, the client application 107 determines an availability of the one or more item detail records in at least one local cache of the at least one device, an expiration of the payload content in the at least one local cache, or a combination thereof. For example, the item detail records that are searched relate to a requested targeted map display and meet the parameters specified in the associated targeted map object. In one embodiment, the local cache stores map item detail records (e.g., records that contain payload content) along with associated validity criteria for the cached content. For example, on making a request to display or update a targeted map, the client application 107 can receive a list of relevant records. The client application 107 can then check the local cache for these records. If the records are available in the cache, the client application 107 can then check whether the record is valid (e.g., not expired and/or within it area, radius, distance, etc. of validity with respect to a mapping area of interest).

In step 503, the client application 107 causes, at least in part, an updating of the at least one local cache based, at least in part, on the availability, the expiration, or a combination thereof. In one embodiment, the client application 107 initiates a call to update or add records only if the records or unavailable, expired, and/or otherwise not valid for a current context/situation of the client application 107. In addition, depending on available cache memory, the client application 107 can remove records that are expired or no longer valid. In one embodiment, if a record is not valid because of a current content (e.g., location, time-of-day, etc.), then the record can be maintained in the cache in case the content or situation changes to where the record becomes valid.

In step 505, the client application 107 presents the payload content of the map item detail records in a targeted map display. In one embodiment, the presentation of the payload content is performed using item description containers that are tailored to the presenting device.

Figure 6:
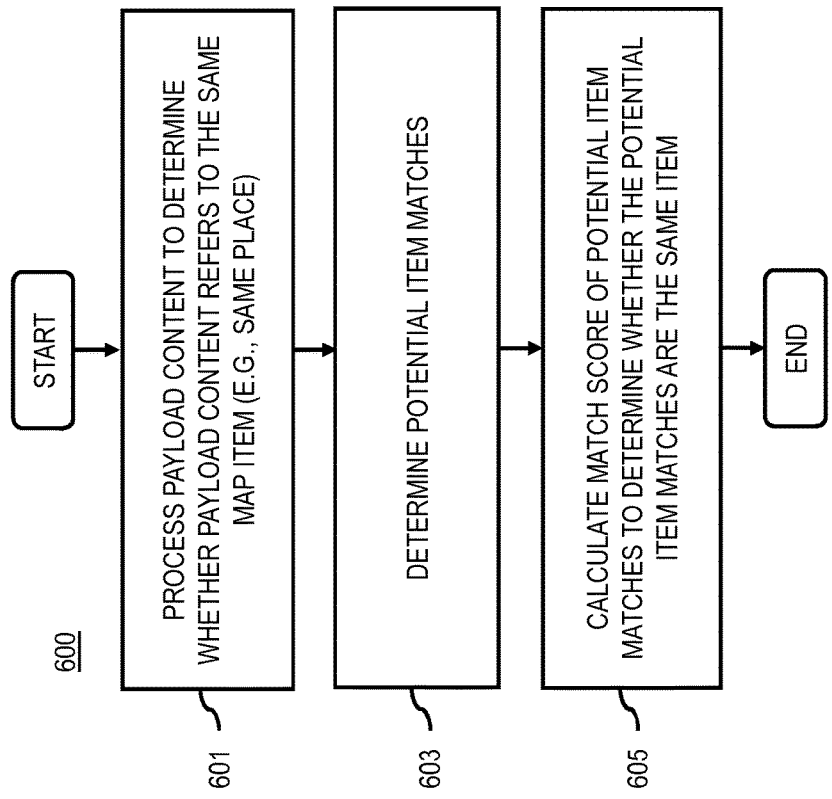
FIG. 6 is a flowchart of a process for map item matching for payload content retrieved from a plurality of data sources, according to one embodiment.

FIG. 6 is a flowchart of a process for map item matching for payload content retrieved from a plurality of data sources, according to one embodiment. In one embodiment, the targeted mapping platform 103 performs the process 600 and is implemented in, for instance, a chip set including a processor and a memory as shown in FIG. 10. In addition or alternatively, all or a portion of the process 600 may be performed locally at the UE 101 (e.g., via the client application 107, the targeted mapping module 109, or another equivalent hardware and/or software component).

Because the targeted mapping platform 103 combines payload content from different data sources to generate map item detail records, there can be potential inconsistencies in the terminology used to identify the same map items across the different data sources. For example, there may be slight differences in the names of places (e.g., different spellings, missing articles, etc.), thereby making it potentially difficult to obtain accurate information about a specific map item (e.g., a specific location or place).

For example, the following example illustrates a potential example of the problem of matching a map item that is a POI. In this example, the targeted mapping platform 103 is trying to retrieve information about a place in the city. The name of the place is, for instance, Mike's Irish Pub.

The owner has published the following information on a social network business page:
Name: Mike's Irish Pub
Location: Hauptstrasse 14, 10827 Berlin
Opening Hours: 6 pm-2 am
A review website has created the following entry and review:
Name: Mike's Pub
Location: 52.489101, 13.359728
Review: Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum . . . .
A pub directory service has created the following entry:
Name: Mike's Irish Pub
Location: on Hauptstrasse, Berlin
Serves: Stout beer Because of the differences between these entries for the same place, it can be difficult for the targeted mapping platform 103 to determine that these descriptions refer to one single place. Accordingly, in one embodiment, the targeted mapping platform 103 can use map item or place matching to be able to identify the "same" map item or place form two or more different descriptions in two or more separate data sources to enable users to seamlessly receive information the different data sources. An example map item matching (e.g. place matching) process is described below.

In step 601, the targeted mapping platform 103 processes and/or facilitates a processing of the payload content to initiate a determination of whether the payload content retrieved from the plurality of data sources is associated with a same one of the one or more map items, wherein the aggregation of the payload content for storage in the at least one map item detail record is based, at least in part, on the determination. In one embodiment, the processing begins by simplifying the map item names (e.g., place names) for string comparison. By way of example, the simplification includes removing special characters (e.g., punctuation, etc.) while leaving spaces. The simplification can also include making the case of the characteristics, e.g., place all characters in lower case, upper case, initial capitals, or some other consistent case scheme.

In step 603, the targeted mapping platform 103 determines one or more potential item matches in the payload content retrieved from different ones of the plurality of data sources. For example, once the map item names or other identifying terms are simplified, the targeted mapping platform 103 can identify terms from different data sources that could be potentially matched. In one embodiment, this step can be skipped if all possible matches are to be processed.

In step 605, the targeted mapping platform 103 causes, at least in part, a calculation of at least one match score between the one or more potential item matches based, at least in part, on a string comparison, a string distance comparison, a determination of whether a first item match is contained in a second item match, a physical distance comparison, a metaphone encoding comparison, a confidence score calculation, or a combination thereof. For example, to perform a simple string comparison, the targeted mapping platform 103 can determine how many characters between two or more potential item terms/names match.

With respect to a string distance comparison, the targeted mapping platform 103 can use a Jaro-Winkler string distance computation. For example, the string distance (e.g., Jaro distance, $d_j$) of two given strings $s_1$ and $s_2$ is as follows:

$$d_j = \begin{cases} 0 & \text{if } m = 0 \\ \frac{1}{3}\left(\frac{m}{|s_1|} + \frac{m}{|s_2|} + \frac{m-t}{m}\right) & \text{otherwise} \end{cases}$$

where: m is the number of matching characters and t is half the number of transpositions.

In one embodiment, the value calculated for the Jaro-Winkler string distance is set as STRING_DISTANCE.

The calculation of the match score also includes determining whether either string completely contains the other (e.g., "Place Name" vs. "The Place Name"). If this is true, then the value of CONTAINS is set to 1, otherwise the value is set to 0.

In one embodiment, with respect to physical distance, if the two map items are less than a threshold distance apart (e.g., 100 meters), the value of DISTANCE is set to 1, otherwise the value is set to 0. In the example noted above, the address provided on the social network business page might resolve to slightly different coordinates than those noted in the review website, while still referring to the same place (i.e., both are within the threshold distance).

In one embodiment, with respect to metaphone encoding, two strings are encoded based on a phonetic algorithm (e.g., English phonetic algorithm) to determine whether the two strings are phonetically similar. In one embodiment, the targeted mapping platform 103 can determine primary (P) and secondary (S) double metaphone encodings. Then the following metaphone comparisons are preformed: P-P, P-S, S-P, and S-S. If any of these are true, then the value of SOUNDS_LIKE is set to 1, otherwise the value is set to 0.

Finally, in one embodiment, a confidence score of the match is calculated using the following formula: DISTANCE*(STRING_DISTANCE+CONTAINS+SOUNDS_LIKE).

In one embodiment, the determination of whether the payload content retrieved from the plurality of data sources is associated with the same one of the one or more map items is based, at least in part, on the at least one match score. In one embodiment, the match score calculated above are then evaluated according to the Table 3.

TABLE 3

| Match Score | Outcome |
| --- | --- |
| Less than 1 | No Match |
| 1 to 2 | Possible Match |
| 2 to 3 | Probable Match |
| More than 3 | Definite Match |

In one embodiment, once the different responses from the different data sources have been determined to describe the same map item (e.g., place or location), the responses (e.g., payload content) can be aggregated and returned as payload for provision a targeted map display (e.g., via a map item description container).

Figure 7:
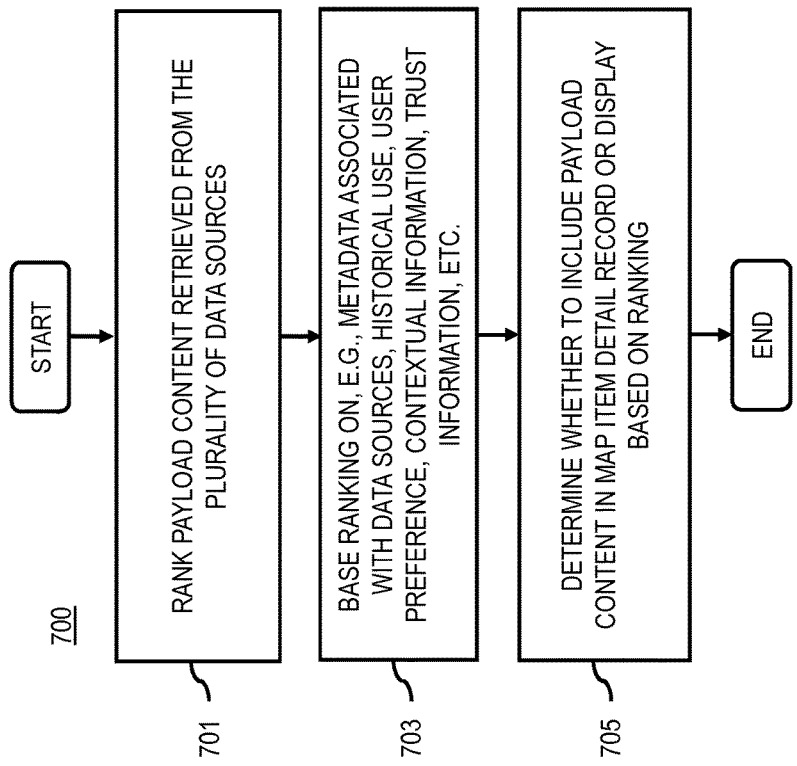
FIG. 7 is a flowchart of a process for ranking payload content based on the data source, according to one embodiment.

FIG. 7 is a flowchart of a process for ranking payload content based on the data source, according to one embodiment. In one embodiment, the targeted mapping platform 103 performs the process 600 and is implemented in, for instance, a chip set including a processor and a memory as shown in FIG. 10. In addition or alternatively, all or a portion of the process 600 may be performed locally at the UE 101 (e.g., via the client application 107, the targeted mapping module 109, or another equivalent hardware and/or software component).

In step 701, the targeted mapping platform 103 causes, at least in part, a ranking of the payload content retrieved from different ones of the plurality of data sources. In one embodiment, the payload content received from different data sources may be given different ranks, orders, weighting, etc. depending on the characteristics of the supplying data source.

In step 703, the targeted mapping platform 103 bases the ranking on metadata associated with the plurality of data sources, historical use information, user preference information, contextual information, trust information, or combination thereof. For example, metadata associated with the data source can be used to identify the data source and/or any quality metric associated with the data source. Content originating from well-established or known data sources can be ranked higher.

In one embodiment, historical use information can be processes to determine how to rank payload content from different data sources. For example, content from data sources that have been used more often by the user can be given a higher rank. In other example, the user may manually specify preferences for a particular ranking for a data source. Additionally, contextual information can be used for ranking purposes. For example, on data source may have better descriptions for one type of POI (e.g., restaurants) while another data source may have better descriptions for another type of POI (e.g., sporting venues). In another embodiment, data sources can be associated with trust information (e.g., user feedback information, etc.) that can be used for ranking. It is contemplated that the targeted mapping platform can use any method or scheme for ranking content.

In step 705, the targeted mapping platform 103 optionally determines whether to include the payload content in a map item detail record or targeted map display based on the ranking. For example, the targeted mapping platform 103 can set ranking criteria (e.g., only the top five content sources are to be assembled, etc.).

Figure 8A:
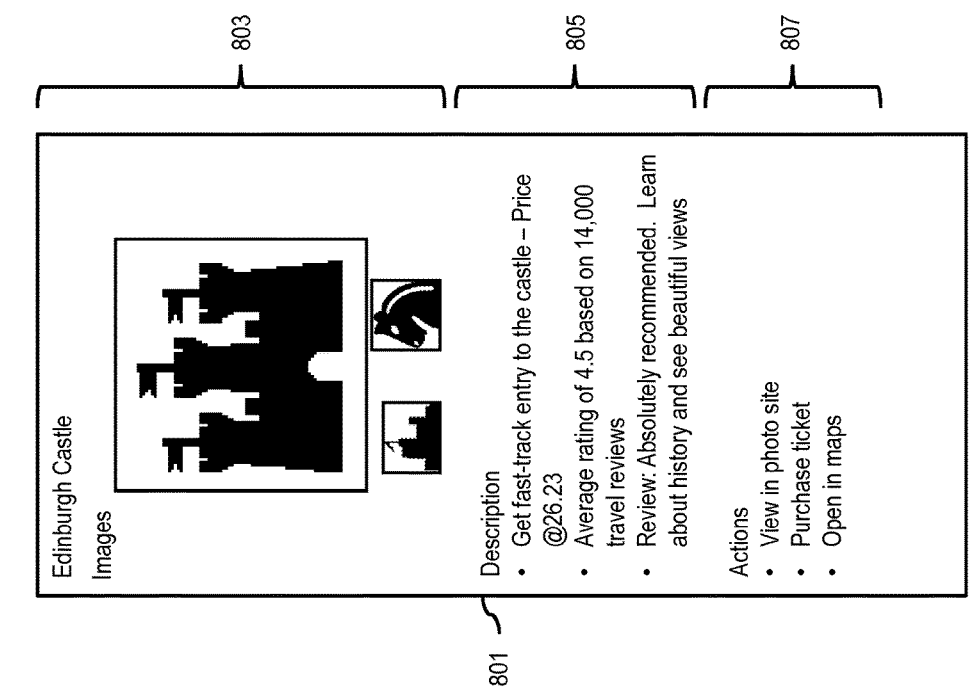
FIGS. 8A-8C are diagrams of user interfaces used in the processes for providing a targeted map display from a plurality of data sources, according to various embodiments.
Figure 8B:
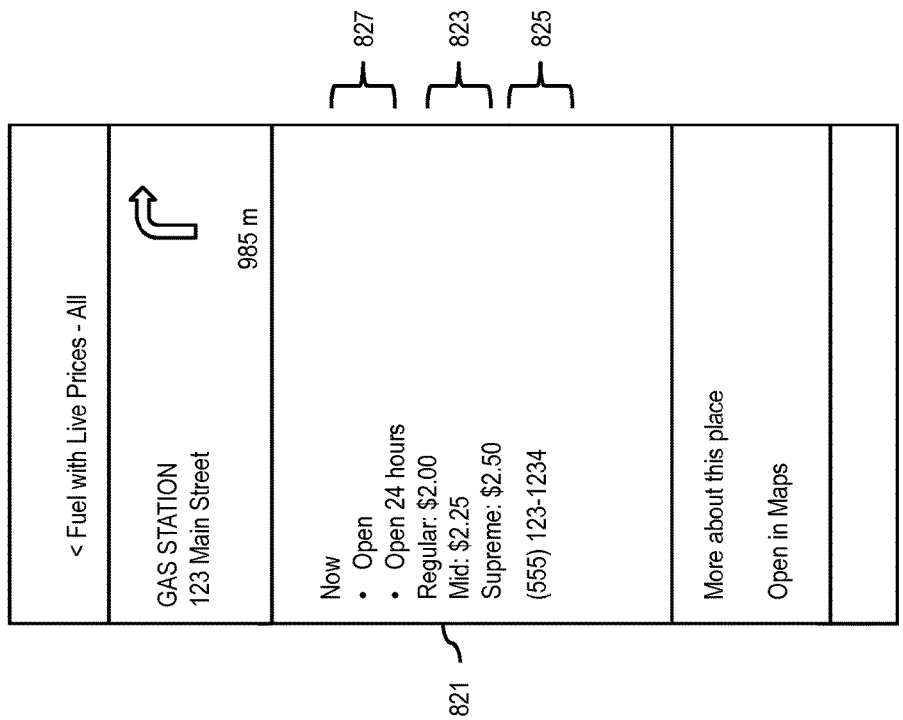
Figure 8C:
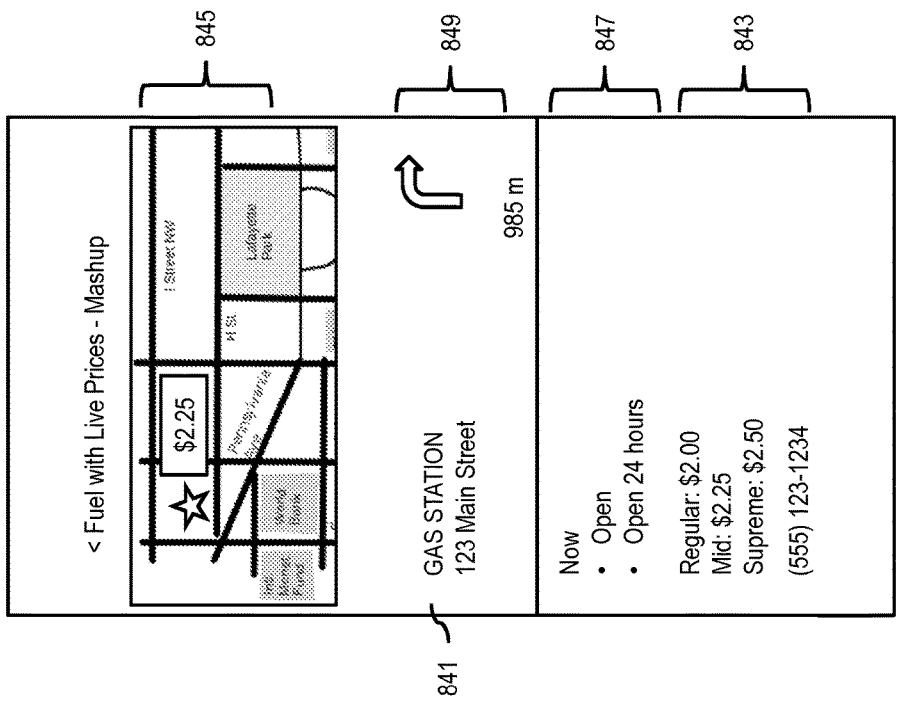

FIGS. 8A-8C are diagrams of user interfaces used in the processes for providing a targeted map display from a plurality of data sources, according to various embodiments. More specifically, FIG. 8A is a diagram of a map item description container 801 that presents targeted content from a map item detail record that has been assembled from multiple data sources. In this example, the map item description container is part of a targeted map object that has been tailored to castle tours of Scotland. Accordingly, the underlying map object includes parameters that select map item detail records related to castles in Scotland. As shown, the map item description container is associated with a place (e.g., Edinburgh castle) that satisfies the targeting criteria. In one embodiment, the map item description container 801 also contains formatting parameters to format the visual representation of the assembled content for a selected display. In this way, the item description container 801 can cater to displays of varying sizes depending on the display device (e.g., mobile phone, car infotainment system, smartwatch, etc.). More specifically, the container 801 includes a section 803 for displaying multiple images assembled from multiple image sharing sites in a consistent layout.

The map item description container 801 also includes a description section 805 for presenting description and reviews assembled from three different travel and mapping services. In this example, the descriptions are ordered based on popularity rankings with descriptions from more popular data sources listed first in the description section. As shown, the formatting from descriptions from the different sources has been made consistent to provide a seamless appearance to the end user, so that the content appears as a cohesive presentation.

As shown, the map item description container 801 further includes a section 807 that provide links and actions that can be performed or otherwise supported by the underlying data sources contributing the targeted content.

FIG. 8B is a diagram of a map item description container 821 that presents a text-based display of map content targeted for displaying automobile related information (e.g., fuel prices). Accordingly, the underlying targeted map object specifies parameters for selecting automobile related map items (e.g., places, POIs, etc.). In this example, the map item detail record assembles fuel prices from a first data source for display in section 823 as text, and assembles opening hours and address information from a second data source for display respectively in sections 825 and 827 as text. As shown, the text layout of the container 821 is designed for a mobile device provides a seamless visual representation that makes the assembled content appear as if the content came from one unified source.

FIG. 8C is a diagram of a map item description container 841 that is similar to the container 821 described above but adds a visual map display targeted for displaying automobile related information (e.g., fuel prices) from the same underlying map item detail record as illustrated in FIG. 8B. Accordingly, by applying a new container 841 over the same record, the targeted mapping platform can provide a different visual representation. As shown, in addition to the fuel prices assembled for the first data shown in text in section 843, the container provides a visual map in which the fuel price is also annotated on the location of the fuel station in section 845. The opening hours and address obtained from the second data source is provided respectively in sections 847 and 849.

The processes described herein for providing a targeted map display from a plurality of data sources may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
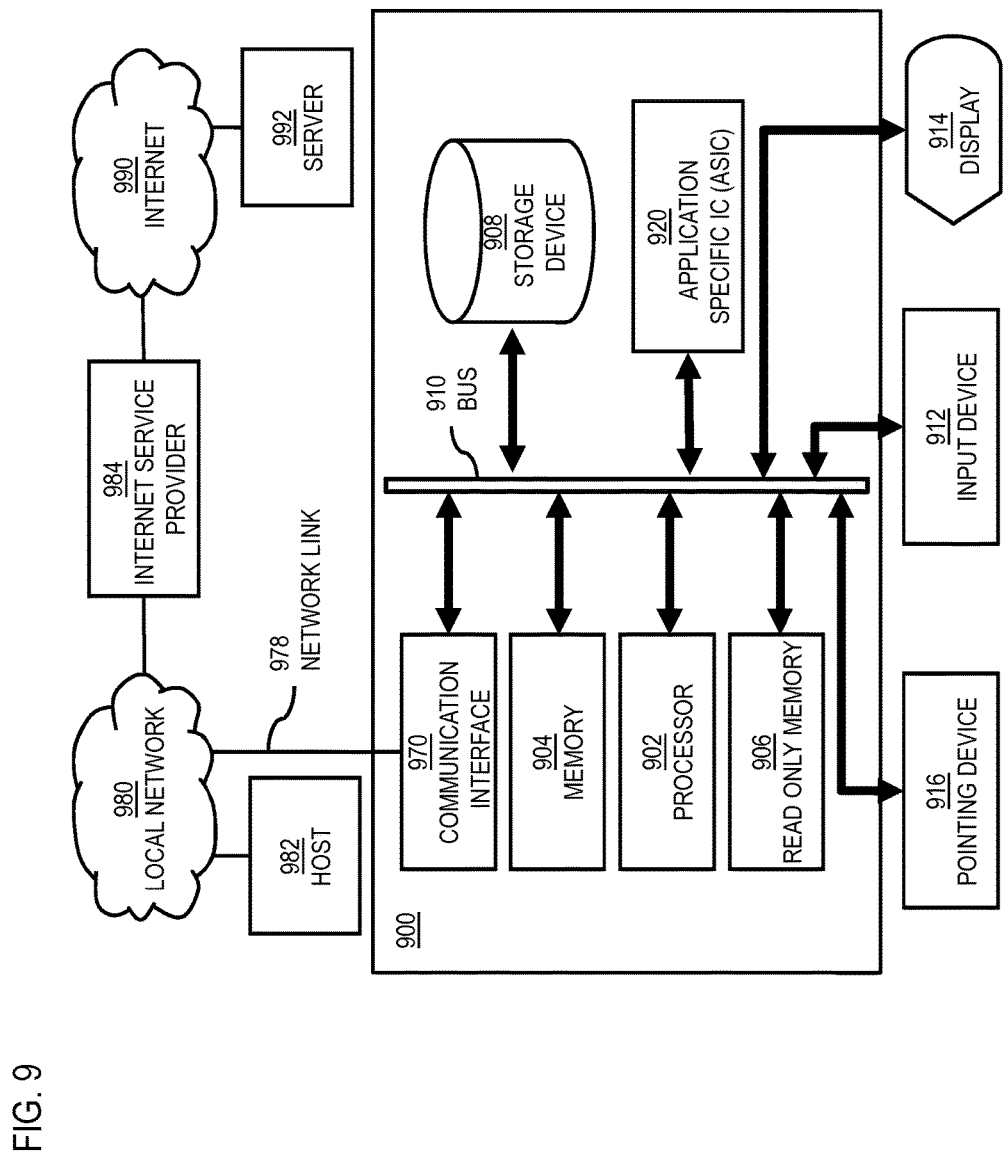
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide a targeted map display from a plurality of data sources as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing a targeted map display from a plurality of data sources.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing a targeted map display from a plurality of data sources. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing a targeted map display from a plurality of data sources. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing a targeted map display from a plurality of data sources, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing a targeted map display from a plurality of data sources.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide a targeted map display from a plurality of data sources as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing a targeted map display from a plurality of data sources.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide a targeted map display from a plurality of data sources. The memory 1005 also stores the data associated with or generated by the execution of the inventive steps.

Figure 11:
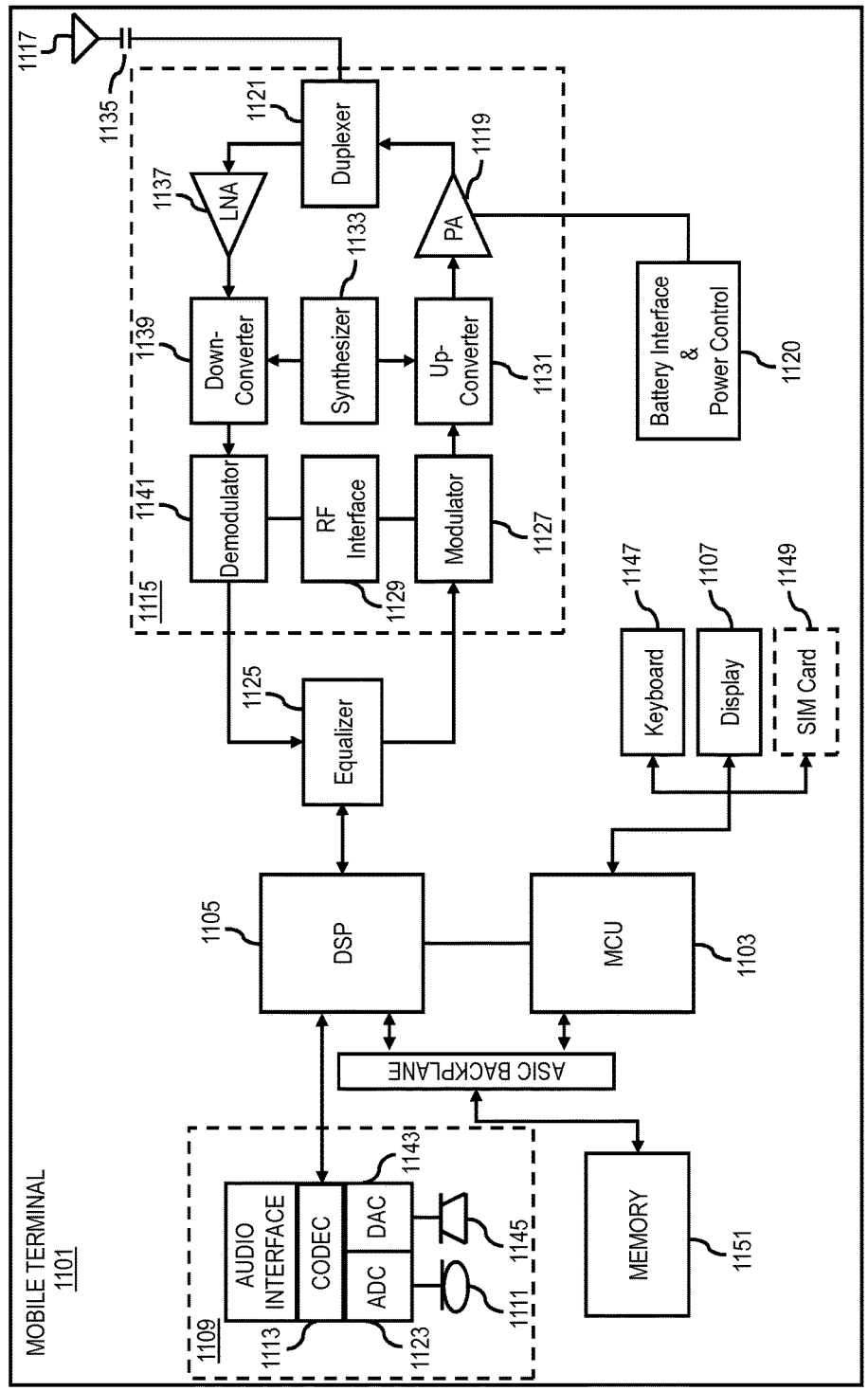
FIG. 11 is a diagram of a mobile terminal (e.g., mobile computer) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing a targeted map display from a plurality of data sources. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing a targeted map display from a plurality of data sources. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide a targeted map display from a plurality of data sources. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing a targeted map display from a plurality of data sources, the method comprising:
   receiving at least one request including parameter information describing one or more parameters configured to retrieving targeted content from the plurality of data sources to provision the targeted map display for at least one device based, at least in part, on the received parameter information;
   configuring, utilizing at least one processor, at least one targeted mapping object data structure based on the received parameter information,
      wherein the configured at least one targeted mapping object data structure incorporates the one or more parameters;
   determining a plurality of map item detail records based, at least in part, on the one or more parameters as incorporated in the at least one targeted mapping object data structure,
      wherein the determined plurality of map item detail records includes payload content about two or more map items, the payload content being retrieved and assembled from different ones of the plurality of data sources; and
   causing, at least in part, a selective updating of the targeted map display with one or more map item detail records from the determined plurality of map item detail records,
      wherein the selective updating is configured to optimize the targeted display for presenting via the at least one device,
      wherein the selective updating is based, at least in part, on one or more validity criteria configured to modify provisioning of the targeted map display,
      wherein the one or more validity criteria are based, at least in part, on the received parameter information.

2. A method of claim 1, further comprising:
   causing, at least in part, an aggregation of the payload content for storage in the one or more map item detail records for presentation utilizing at least one item description container,
      wherein the at least one item description container is a representation of the one or more map item detail records that are to be presented in the at least one targeted map display on the at least one device,
      wherein a utilization of the configured at least one targeted mapping object data structure in the method for providing the targeted map display reduces an amount of bandwidth occupied, an amount of processing requirements utilized, or a combination thereof than otherwise is associated with providing the targeted map display with content from the plurality of data sources.

3. A method of claim 2, further comprising:
   causing, at least in part, a transmission of the one or more map item detail records from the plurality of map item detail records to the at least one device for presentation in the at least one targeted map display using the at least one description container.

4. A method of claim 2, further comprising:
   processing and/or facilitating a processing of the payload content to initiate a determination of whether the payload content retrieved from the plurality of data sources is associated with a same one of the one or more map items,
      wherein the aggregation of the payload content for storage in the one or more map item detail records is based, at least in part, on the determination.

5. A method of claim 4, further comprising:
   determining one or more potential item matches in the payload content retrieved from different ones of the plurality of data sources; and
   causing, at least in part, a calculation of at least one match score between the one or more potential item matches based, at least in part, on a string comparison, a string distance comparison, a determination of whether a first item match is contained in a second item match, a physical distance comparison, a metaphone encoding comparison, a confidence score calculation, or a combination thereof,
      wherein the determination of whether the payload content retrieved from the plurality of data sources is associated with the same one of the one or more map items is based, at least in part, on the at least one match score.

6. A method of claim 1, further comprising:
   determining contextual information associated with the at least one targeted map display, the at least one device, or a combination thereof,
      wherein the determining of the one or more map item detail records, the selective updating of the one or more map item detail records, the provisioning of the at least one map display, or a combination thereof is further based, at least in part, on the contextual information.

7. A method of claim 6, wherein the contextual information includes a currently viewed area of the at least one map display, weather information, location information, temporal information, activity information, or a combination thereof.

8. A method of claim 1, further comprising:
   determining an availability of the one or more item detail records in at least one local cache of the at least one device, an expiration of the one or more map item detail records in the at least one local cache, or a combination thereof; and
   causing, at least in part, an updating of the at least one local cache based, at least in part, on the availability, the expiration, or a combination thereof.

9. A method of claim 1, further comprising:
   causing, at least in part, a ranking of the payload content retrieved from different ones of the plurality of data sources based, at least in part, on metadata associated with the plurality of data sources, historical use information, user preference information, contextual information, trust information, or a combination thereof.

10. A method of claim 1, wherein the one or more parameters of the at least one targeted mapping object data structure includes one or more map areas of interest, one or more targeted map items, one or more types of targeted map items, targeted location-based content, one or more lists of the plurality of data sources to target, the one or more validity criteria, or a combination thereof.

11. An apparatus for providing a targeted map display from a plurality of data sources, the apparatus comprising:
   at least one processor; and at least one memory including computer program code for one or more programs, the at least one memory and the computer program code configured to, with the at least one processor, cause the apparatus to perform at least the following;

receive at least one request including parameter information describing one or more parameters configured to retrieving targeted content from the plurality of data sources to provision the targeted map display for at least one device based, at least in part, on the received parameter information, configure at least one targeted mapping object data structure based on the received parameter information,
  wherein the configured at least one targeted mapping object data structure includes incorporates the one or more parameters, determine a plurality of map item detail records based, at least in part, on the one or more parameters as incorporated in the at least one targeted mapping object data structure,
  wherein the determined plurality of map item detail records includes payload content about two or more map items, the payload content being retrieved and assembled from different ones of the plurality of data sources, and cause, at least in part, a selective updating of the targeted map display with one or more map item detail records from the determined plurality of map item detail records,
  wherein the selective updating is configured to optimize the targeted display for presenting via the at least one device,
  wherein the selective updating is based, at least in part, on one or more validity criteria configured to modify provisioning of the targeted map display,
  wherein the one or more validity criteria are based, at least in part, on the received parameter information.

12. An apparatus of claim 11, wherein the apparatus is further caused to:
cause, at least in part, an aggregation of the payload content for storage in the one or more map item detail records for presentation utilizing at least one item description container,
  wherein the at least one item description container is a representation of the one or more map item detail records that are to be presented in the at least one targeted map display on the at least one device,
  wherein a utilization of the configured at least one targeted mapping object data structure in the method for providing the targeted map display reduces an amount of bandwidth occupied, an amount of processing requirements utilized, or a combination thereof than otherwise is associated with providing the targeted map display with content from the plurality of data sources.

13. An apparatus of claim 12, wherein the apparatus is further caused to:
cause, at least in part, a transmission of the one or more map item detail records from the plurality of map item detail records to the at least one device for presentation in the at least one targeted map display using the at least one description container.

14. An apparatus of claim 12, wherein the apparatus is further caused to:
process and/or facilitate a processing of the payload content to initiate a determination of whether the payload content retrieved from the plurality of data sources is associated with a same one of the one or more map items,
  wherein the aggregation of the payload content for storage in the one or more item detail records is based, at least in part, on the determination.

15. An apparatus of claim 14, wherein the apparatus is further caused to:
determine one or more potential item matches in the payload content retrieved from different ones of the plurality of data sources, and
cause, at least in part, a calculation of at least one match score between the one or more potential item matches based, at least in part, on a string comparison, a string distance comparison, a determination of whether a first item match is contained in a second item match, a physical distance comparison, a metaphone encoding comparison, a confidence score calculation, or a combination thereof,
  wherein the determination of whether the payload content retrieved from the plurality of data sources is associated with the same one of the one or more map items is based, at least in part, on the at least one match score.

16. An apparatus of claim 11, wherein the apparatus is further caused to:
determine contextual information associated with the at least one targeted map display, the at least one device, or a combination thereof,
  wherein the determining of the one or more map item detail records, the selective updating of the one or more map item detail records, the provisioning of the at least one map display, or a combination thereof is further based, at least in part, on the contextual information.

17. An apparatus of claim 11, wherein the apparatus is further caused to:
determine an availability of the one or more map item detail records in at least one local cache of the at least one device, an expiration of the one or more map item detail records in the at least one local cache, or a combination thereof, and
cause, at least in part, an updating of the at least one local cache based, at least in part, on the availability, the expiration, or a combination thereof.

18. A non-transitory computer-readable storage medium for providing a targeted map display from a plurality of data sources, the computer-readable storage medium carrying one or more sequences of one or more instructions which, when executed by one or more processors, cause an apparatus to perform:
receiving at least one request including parameter information describing one or more parameters configured to retrieving targeted content from the plurality of data sources to provision the targeted map display for at least one device based, at least in part, on the received parameter information;
configuring at least one targeted mapping object data structure based on the received parameter information,
  wherein the configured at least one targeted mapping object data structure incorporates the one or more parameters;

determining a plurality of map item detail records based, at least in part, on the one or more parameters as incorporated in the at least one targeted mapping object data structure,
    wherein the determined plurality of map item detail records includes payload content about two or more map items, the payload content being retrieved and assembled from different ones of the plurality of data sources; and causing, at least in part, a selective updating of the targeted map display with one or more map item detail records from the determined plurality of map item detail records,
    wherein the selective updating is configured to optimize the targeted display for presenting via the at least one device,
    wherein the selective updating is based, at least in part, on one or more validity criteria configured to modify provisioning of the targeted map display,
    wherein the one or more validity criteria are based, at least in part, on the received parameter information.

19. A computer-readable storage medium of claim 18, wherein the apparatus is further caused to perform:

causing, at least in part, an aggregation of the payload content for storage in the one or more map item detail records for presentation utilizing at least one item description container,
    wherein the at least one item description container is a representation of the one or more map item detail records that are to be presented in the at least one targeted map display on the at least one device,
    wherein a utilization of the configured at least one targeted mapping object data structure in the method for providing the targeted map display reduces an amount of bandwidth occupied, an amount of processing requirements utilized, or a combination thereof than otherwise is associated with providing the targeted map display with content from the plurality of data sources.

20. A computer-readable storage medium of claim 19, wherein the apparatus is further caused to perform:

causing, at least in part, a transmission of the one or more map item detail records from the plurality of map item detail records to the at least one device for presentation in the at least one targeted map display using the at least one description container.

* * * * *